United States Patent
Pepper et al.

(10) Patent No.: US 9,873,958 B2
(45) Date of Patent: *Jan. 23, 2018

(54) FIBERS MADE FROM POLYETHYLENE COMPOSITIONS, AND METHOD OF MAKING THE SAME

(71) Applicant: Dow Global Technologies LLC, Midland, MI (US)

(72) Inventors: Randy E. Pepper, Katy, TX (US); Mridula Babli Kapur, Lake Jackson, TX (US); Gert J. Claasen, Richterswil (CH); Edward N. Knickerbocker, Lake Jackson, TX (US); Nathan J. Wiker, Houston, TX (US); William J. Michie, Jr., Missouri City, TX (US); Mark B. Davis, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,245

(22) Filed: Feb. 20, 2017

(65) Prior Publication Data

US 2017/0159211 A1 Jun. 8, 2017

Related U.S. Application Data

(63) Continuation of application No. 12/739,511, filed as application No. PCT/US2009/050003 on Jul. 9, 2009, now Pat. No. 9,663,642.

(60) Provisional application No. 61/079,453, filed on Jul. 10, 2008.

(51) Int. Cl.
| | |
|---|---|
| *D01F 6/04* | (2006.01) |
| *D01F 6/30* | (2006.01) |
| *D04H 3/007* | (2012.01) |
| *C08F 210/02* | (2006.01) |
| *D01D 5/08* | (2006.01) |
| *D01D 10/02* | (2006.01) |
| *D04H 1/56* | (2006.01) |
| *D04H 3/16* | (2006.01) |

(52) U.S. Cl.
CPC .............. *D01F 6/30* (2013.01); *C08F 210/02* (2013.01); *D01D 5/08* (2013.01); *D01D 10/02* (2013.01); *D04H 1/56* (2013.01); *D04H 3/007* (2013.01); *D04H 3/16* (2013.01)

(58) Field of Classification Search
CPC ...... C08F 10/02; C08F 110/02; C08F 210/02; C08F 210/16; C08L 23/04; C08L 23/0815; D04H 1/56; D04H 3/007; D04H 3/16; D01F 6/04; D01F 6/30; D01D 5/08; D01D 5/10; D01D 5/12; D01D 10/02
USPC ....... 428/365, 364, 359; 264/177.13, 211.22, 264/178 F; 442/49, 189, 308, 334, 50, 442/324; 526/348, 348.1
See application file for complete search history.

(56) References Cited

U.S. PATENT DOCUMENTS

2008/0038533 A1* 2/2008 Best .................. B32B 27/32
428/220

* cited by examiner

*Primary Examiner* — Roberto Rabago

(57) ABSTRACT

Fibers made a polyethylene composition, and method of making the same. The polyethylene composition comprises less than or equal to 100 percent by weight of the units derived from ethylene and less than 20 percent by weight of units derived from one or more α-olefin comonomers; wherein said polyethylene composition has a density in the range of 0.930 to 0.960 g/cm$^3$, a molecular weight distribution (Mw/Mn) in the range of 1.70 to 3.5, a melt index ($I_2$) in the range of 1 to 300 g/10 minutes, a molecular weight distribution (Mz/Mw) in the range of less than 2.5, a shear viscosity in the range of 20 to 250 Pascal-s at 3000 s$^{-1}$ shear rate measured at 190° C., vinyl unsaturation of less than 0.1 vinyls per one thousand carbon atoms present in the backbone of said composition; and wherein the fiber is a monocomponent meltspun fiber.

16 Claims, 6 Drawing Sheets

FIBERS MADE FROM POLYETHYLENE COMPOSITIONS, AND METHOD OF MAKING THE SAME

CROSS-REFERENCE TO RELATED APPLICATIONS

This application is a non-provisional application claiming priority from U.S. Provisional Patent Application No. 61/079,453, filed on Jul. 10, 2008, entitled "TEXTILE FIBER FROM HDPE FOR SOFT WOVEN FABRICS," the teachings of which are incorporated by reference herein, as if reproduced in full hereinbelow. This application is also a continuation application claiming priority from U.S. patent application Ser. No. 12/739,511, filed on Jul. 9, 2009, now U.S. Pat. No. 9,663,642, entitled "POLYETHYLENE COMPOSITIONS, METHOD OF PRODUCING THE SAME, FIBERS MADE THEREFROM, AND METHOD OF MAKING THE SAME," which is a 371 of International Patent Application No. PCT/US09/50003 filed Jul. 9, 2009; the teachings of which are incorporated by reference herein, as if reproduced in full hereinbelow.

FIELD OF INVENTION

The instant invention relates to polyethylene compositions, method of producing the same, fibers made therefrom, method of making the same, fabrics made from such fibers, and method of making such fabrics.

BACKGROUND OF THE INVENTION

The use of polymeric compositions such as polyolefins in producing fibers is generally known. Exemplary polyolefins include, but are not limited to, polypropylene compositions. Such fibers may be formed into fabrics, e.g. woven fabrics or non-woven fabrics. Different techniques may be employed to form such fabrics. Such techniques are generally known to persons of ordinary skill in the art.

Despite the research efforts in developing compositions suitable for fibers, there is still a need for a polyethylene composition that is spinnable into a low denier/filament yarn with improved tenacity and haptics. Furthermore, there is still a need for a process for producing a polyethylene composition that is spinnable into a low denier/filament yarn with improved tenacity and haptics. Additionally, there is still a need for polyethylene fibers that facilitate the production of woven and non-woven fabrics having improved properties such as improved softness and drapeability.

SUMMARY OF THE INVENTION

The instant invention is a polyethylene composition, method of producing the same, fibers made therefrom, and method of making the same. The polyethylene composition according to instant invention comprises: (a) less than or equal to 100 percent by weight of the units derived from ethylene; and (b) less than 20 percent by weight of units derived from one or more α-olefin comonomers. The polyethylene composition according to instant invention has a density in the range of 0.920 to 0.970 g/cm$^3$, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition. The process for producing the inventive polyethylene composition comprises the steps of: (1) (co)polymerizing ethylene and optionally one or more α-olefin comonomers in the presence of a hafnium based metallocene catalyst via a gas phase (co)polymerization process in a single stage reactor; and (2) thereby producing the polyethylene composition having a density in the range of 0.920 to 0.970 g/cm$^3$, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition. The fibers according to the instant invention comprise a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.920 to 0.970 g/cm$^3$, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition. The process for making a fiber according to instant invention comprises the steps of: (1) selecting a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.920 to 0.970 g/cm$^3$, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition; (2) spinning the polyethylene composition into a fiber; and (3) thereby forming the fiber.

In one embodiment, the instant invention provides a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.920 to 0.970 g/cm$^3$, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition.

In one embodiment, the instant invention provides a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.920 to 0.970 g/cm$^3$, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition.

In one embodiment, the instant invention provides a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.930 to 0.960 g/cm³, a molecular weight distribution ($M_w/M_n$) in the range of 1.70 to 3.5, a melt index ($I_2$) in the range of 1 to 50 g/10 minutes, a molecular weight distribution ($M_z/M_w$) in the range of less than 2.5, vinyl unsaturation of less than 0.06 vinyls per one thousand carbon atoms present in the backbone of the composition.

In one embodiment, the instant invention provides a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.940 to 0.955 g/cm³, a molecular weight distribution ($M_w/M_n$) in the range of 1.70 to 3.5, a melt index ($I_2$) in the range of 3 to 10 g/10 minutes, a molecular weight distribution ($M_z/M_w$) in the range of less than 2.5, vinyl unsaturation of less than 0.06 vinyls per one thousand carbon atoms present in the backbone of the composition.

In one embodiment, the instant invention provides a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.930 to 0.955 g/cm³, a molecular weight distribution ($M_w/M_n$) in the range of 1.70 to 3.5, a melt index ($I_2$) in the range of 3 to 10 g/10 minutes, a molecular weight distribution ($M_z/M_w$) in the range of less than 2.5, vinyl unsaturation of less than 0.06 vinyls per one thousand carbon atoms present in the backbone of the composition.

In one embodiment, the instant invention provides a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.930 to 0.955 g/cm³, a molecular weight distribution ($M_w/M_n$) in the range of 1.70 to 3.5, a melt index ($I_2$) in the range of 5 to 10 g/10 minutes, a molecular weight distribution ($M_z/M_w$) in the range of less than 2.5, vinyl unsaturation of less than 0.06 vinyls per one thousand carbon atoms present in the backbone of the composition.

In one embodiment, the instant invention provides a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.920 to 0.960 g/cm³, a molecular weight distribution ($M_w/M_n$) in the range of 1.70 to 3.5, a melt index ($I_2$) in the range of 1 to 50 g/10 minutes, a molecular weight distribution ($M_z/M_w$) in the range of less than 2.5, vinyl unsaturation of less than 0.06 vinyls per one thousand carbon atoms present in the backbone of the composition.

In an alternative embodiment, the instant invention further provides a method for producing a polyethylene composition comprising the steps of: (1) (co)polymerizing ethylene and optionally one or more α-olefin comonomers in the presence of a hafnium based metallocene catalyst via a gas phase (co)polymerization process in a single stage reactor; and (2) thereby producing a polyethylene composition having a density in the range of 0.920 to 0.970 g/cm³, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition.

In an alternative embodiment, the instant invention further provides a method for producing a polyethylene composition comprising the steps of: (1) (co)polymerizing ethylene and optionally one or more α-olefin comonomer in the presence of a hafnium based metallocene catalyst via a gas phase (co)polymerization process in a single stage reactor; and (2) thereby producing the inventive polyethylene composition, wherein the polyethylene composition has a density in the range of 0.920 to 0.970 g/cm³, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.06 vinyls per one thousand carbon atoms present in the backbone of the composition.

In an alternative embodiment, the instant invention further provides a method for producing a polyethylene composition comprising the steps of: (1) (co)polymerizing ethylene and optionally one or more α-olefin comonomer in the presence of a hafnium based metallocene catalyst via a gas phase (co)polymerization process in a single stage reactor; and (2) thereby producing the inventive polyethylene composition, wherein the polyethylene composition has a density in the range of 0.930 to 0.960 g/cm³, a molecular weight distribution ($M_w/M_n$) in the range of 1.70 to 3.5, a melt index ($I_2$) in the range of 1 to 50 g/10 minutes, a molecular weight distribution ($M_z/M_w$) in the range of less than 2.5, vinyl unsaturation of less than 0.06 vinyls per one thousand carbon atoms present in the backbone of the composition.

In an alternative embodiment, the instant invention further provides a method for producing a polyethylene composition comprising the steps of: (1) (co)polymerizing ethylene and optionally one or more α-olefin comonomer in the presence of a hafnium based metallocene catalyst via a gas phase (co)polymerization process in a single stage reactor; and (2) thereby producing the inventive polyethylene composition, wherein the polyethylene composition has a density in the range of 0.940 to 0.955 g/cm³, a molecular weight distribution ($M_w/M_n$) in the range of 1.70 to 3.5, a melt index ($I_2$) in the range of 3 to 10 g/10 minutes, a molecular weight distribution ($M_z/M_w$) in the range of less than 2.5, vinyl unsaturation of less than 0.06 vinyls per one thousand carbon atoms present in the backbone of the composition.

In an alternative embodiment, the instant invention further provides a method for producing a polyethylene composition comprising the steps of: (1) (co)polymerizing ethylene and optionally one or more α-olefin comonomer in the presence of a hafnium based metallocene catalyst via a gas phase (co)polymerization process in a single stage reactor; and (2) thereby producing the inventive polyethylene composition, wherein the polyethylene composition has a density in the range of 0.930 to 0.955 g/cm³, a molecular weight distribution ($M_w/M_n$) in the range of 1.70 to 3.5, a melt index ($I_2$) in the range of 3 to 10 g/10 minutes, a molecular weight distribution ($M_z/M_w$) in the range of less than 2.5, vinyl unsaturation of less than 0.06 vinyls per one thousand carbon atoms present in the backbone of the composition.

In an alternative embodiment, the instant invention further provides a method for producing a polyethylene composition comprising the steps of: (1) (co)polymerizing ethylene and optionally one or more α-olefin comonomer in the presence of a hafnium based metallocene catalyst via a gas phase (co)polymerization process in a single stage reactor; and (2) thereby producing the inventive polyethylene composition, wherein the polyethylene composition has a density in the range of 0.930 to 0.955 g/cm³, a molecular weight distribution ($M_w/M_n$) in the range of 1.70 to 3.5, a melt index ($I_2$) in the range of 5 to 10 g/10 minutes, a molecular weight distribution ($M_z/M_w$) in the range of less than 2.5, vinyl unsaturation of less than 0.06 vinyls per one thousand carbon atoms present in the backbone of the composition.

In an alternative embodiment, the instant invention further provides a method for producing a polyethylene composition comprising the steps of: (1) (co)polymerizing ethylene and optionally one or more α-olefin comonomer in the presence of a hafnium based metallocene catalyst via a gas phase (co)polymerization process in a single stage reactor; and (2) thereby producing the inventive polyethylene composition, wherein the polyethylene composition has a density in the range of 0.920 to 0.960 g/cm³, a molecular weight distribution ($M_w/M_n$) in the range of 1.70 to 3.5, a melt index ($I_2$) in the range of 1 to 50 g/10 minutes, a molecular weight distribution ($M_z/M_w$) in the range of less than 2.5, vinyl unsaturation of less than 0.06 vinyls per one thousand carbon atoms present in the backbone of the composition.

In another alternative embodiment, the instant invention further provides fibers comprising a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.920 to 0.970 g/cm³, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition.

In another alternative embodiment, the instant invention further provides a method for making fibers comprising the steps of: (1) selecting a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.920 to 0.970 g/cm³, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition; (2) spinning the polyethylene composition into a fiber; and (3) thereby forming the fiber.

In another alternative embodiment, the instant invention further provides a fabric comprising a fiber comprising a polyethylene composition comprising: (a) less than or equal to 100 percent by weight of the units derived from ethylene; and (b) less than 20 percent by weight of units derived from one or more α-olefin comonomers; wherein the polyethylene composition has a density in the range of 0.920 to 0.970 g/cm³, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition.

In another alternative embodiment, the instant invention further provides a method for fabricating a fabric comprising the steps of: (1) providing a fiber comprising a polyethylene composition comprising (a) less than or equal to 100 percent by weight of the units derived from ethylene; and (b) less than 20 percent by weight of units derived from one or more α-olefin comonomers; wherein the polyethylene composition has a density in the range of 0.920 to 0.970 g/cm³, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition; (2) fabricating the fiber into a fabric via a process selected from the group consisting of weaving process, knitting process, melt blown process, spunbond process, air laid process, needle punch process, hydroentangling process, electro spinning process, and combinations thereof.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the hafnium based catalyst is a hafnium based bis Cp metallocene catalyst.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the hafnium based catalyst is a dimethyl hafnium based bis Cp metallocene catalyst.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition has a density in the range of 0.930 to 0.960 g/cm³, and a melt index ($I_2$) in the range of 1 to 50 g/10 minutes.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition has a density in the range of 0.940 to 0.955 g/cm³, and a melt index 12 in the range of 3 to 10 g/10 minutes.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition has a molecular weight distribution ($M_w/M_n$) in the range of 1.70 to 3.25.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition has a vinyl unsaturation of less than 0.05 vinyls per one thousand carbon atoms present in the backbone of the composition.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition has less than 2 peaks on an elution temperature-eluted amount curve determined by continuous temperature rising elution fraction method at equal or above 30° C., wherein the purge peak which is below 30° C. is excluded.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition has 1 peak or less on an elution temperature-eluted amount curve determined by continuous temperature rising elution fraction method at equal or above 30° C., wherein the purge peak which is below 30° C. is excluded.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition has only 1 peak on an elution temperature-eluted amount curve determined by continuous temperature rising elution fraction method at equal or above 30° C., wherein the purge peak which is below 30° C. is excluded.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition has a molecular weight distribution ($M_z/M_w$) in the range of less than 2.3.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition comprises less than 15 percent by weight of the units derived from one or more α-olefin comonomers.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition comprises less than 11 percent by weight of the units derived from one or more α-olefin comonomers.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition comprises less than 7 percent by weight of the units derived from one or more α-olefin comonomers.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition comprises less than 5 percent by weight of the units derived from one or more α-olefin comonomers.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition comprises less than 3 percent by weight of the units derived from one or more α-olefin comonomers.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition is substantially free of long chain branching.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition is free of long chain branching.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the polyethylene composition comprises less than 100 parts by weight of hafnium residues remaining from the hafnium based metallocene catalyst per one million parts of polyethylene composition.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a denier per filament in the range of less than 50 g/9000 m.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a denier per filament in the range of less than 40 g/9000 m.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a denier per filament in the range of less than 30 g/9000 m.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a denier per filament in the range of less than 20 g/9000 m.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a denier per filament in the range of less than 10 g/9000 m.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a denier per filament in the range of less than 5 g/9000 m.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a denier per filament in the range of less than 3 g/9000 m.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a tenacity in the range of 0.1 to 5 g/denier.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a tenacity in the range of 1.5 to 5 g/denier.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a tenacity in the range of 2 to 5 g/denier.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a tenacity in the range of 2.0 to 4.5 g/denier.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a tenacity in the range of 2.5 to 4 g/denier.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a tenacity in the range of 2.5 to 3.5 g/denier.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has an elongation measured in percent of less than 1000.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has an elongation measured in percent of less than 300.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has an elongation measured in percent of less than 150.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has an elongation measured in percent of less than 100.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a boiling water shrink measured in percent after being annealed at 120° C. in the range of less than 30.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a boiling water shrink measured in percent after being annealed at 120° C. in the range of less than 20.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a boiling water shrink measured in percent after being annealed at 120° C. in the range of less than 10.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber has a boiling water shrink measured in percent after being annealed at 120° C. in the range of less than 2.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fiber is a staple fiber or a continuous fiber.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric is selected from the group consisting of woven fabric, non-woven fabric, and combinations thereof.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the woven fabric has an abrasion resistance in the range of less 5 percent by weight of abraded fiber per weight of the fabric prior to abrasion testing.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the woven fabric has an abrasion resistance in the range of less 2 percent by weight of abraded fiber per weight of the fabric prior to abrasion testing.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the woven fabric has an abrasion resistance in the range of less 1 percent by weight of abraded fiber per weight of the fabric prior to abrasion testing.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the woven fabric has an abrasion resistance in the range of less 0.8 percent by weight of abraded fiber per weight of the fabric prior to abrasion testing.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a smoothness value in the range of less than 2.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a smoothness value in the range of less than 1.5, e.g. 1.3.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a wax value in the range of greater than 7, e.g. 7.5.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a hand friction value in the range of less than 3.5.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a hand friction value in the range of less than 3.0.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a hand friction value in the range of less than 2.5.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a hand friction value in the range of less than 2.5.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a hand friction value in the range of less than 2.0, e.g. 1.85.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a stiffness value in the range of less than 1.1.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a stiffness value in the range of less than 1.0.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a stiffness value in the range of less than 0.8.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a stiffness value in the range of less than 0.7, e.g. 0.52.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of less than 5 g/9000 m, e.g. 2 g/9000 m, and the fabric has a smoothness value in the range of less than 2, a wax value in the range of greater than 7, a hand friction value in the range of less than 3.5, and a stiffness value in the range of less than 1.1.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of 5 to 7 g/9000 m, e.g. 6 g/9000 m, and the fabric has a smoothness value in the range of less than 8.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of 5 to 7 g/9000 m, e.g. 6 g/9000 m, and the fabric has a smoothness value in the range of less than 7, e.g. 5.30.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of 5 to 7 g/9000 m, e.g. 6 g/9000 m, and the fabric has a wax value in the range of greater than 8, e.g. 8.2.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of 5 to 7 g/9000 m, e.g. 6 g/9000 m, and the fabric has a hand friction value in the range of less than 7.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of 5 to 7 g/9000 m, e.g. 6 g/9000 m, and the fabric has a hand friction value in the range of less than 6.0.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of 5 to 7 g/9000 m, e.g. 6 g/9000 m, and the fabric has a stiffness value in the range of less than 3.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of 5 to 7 g/9000 m, e.g. 6 g/9000 m, and the fabric has a stiffness value in the range of less than 2.0.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of 5 to 7 g/9000 m, e.g. 6 g/9000 m, and the fabric has a stiffness value in the range of less than 1.8.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric comprises one or more fibers having a denier per filament in the range of 5 to 7 g/9000 m, e.g. 6 g/9000 m, and the fabric has a smoothness value in the range of less than 8, a wax value in the range of greater than 8, a hand friction value in the range of less than 7, and a stiffness value in the range of less than 3.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that said fabric is abraded.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that said fabric is abraded about less than 30 weight percent based on the weight of the fabric prior to abrasion.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that said fabric is abraded about less than 20 weight percent based on the weight of the fabric prior to abrasion.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that said fabric is abraded about less than 10 weight percent based on the weight of the fabric prior to abrasion.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that said fabric is abraded about less than 5 weight percent based on the weight of the fabric prior to abrasion.

In an alternative embodiment, the instant invention provides a polyethylene composition, method of producing the same, fibers made therefrom, method of making such fibers, fabrics made from such fibers, and method of fabricating such fabrics, in accordance with any of the preceding embodiments, except that the fabric is used as an article selected from the group consisting of upholstery, apparel, wall covering, carpet, diaper topsheet, diaper backsheet, medical fabric, surgical wrap, hospital gown, wipe, textile, and geotextile.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
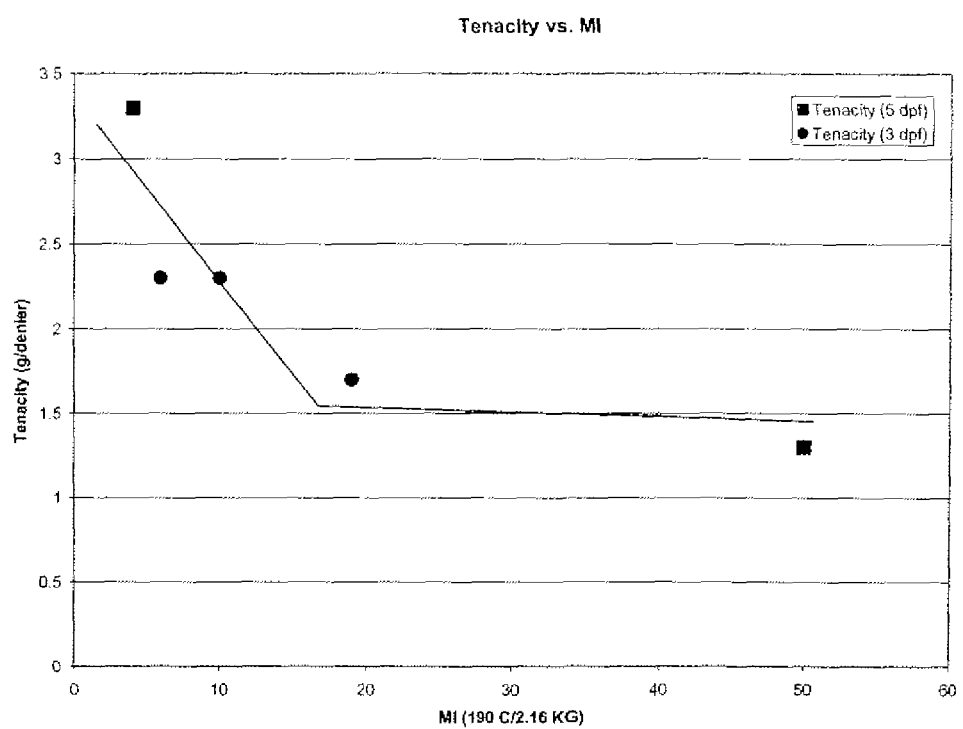
FIG. 1 is a graph depicting the relationship between the Tenacity of the inventive fiber measured in g/denier and Melt Index ($I_2$) of the inventive polyethylene composition measured in g/10 minutes.
Figure 2:
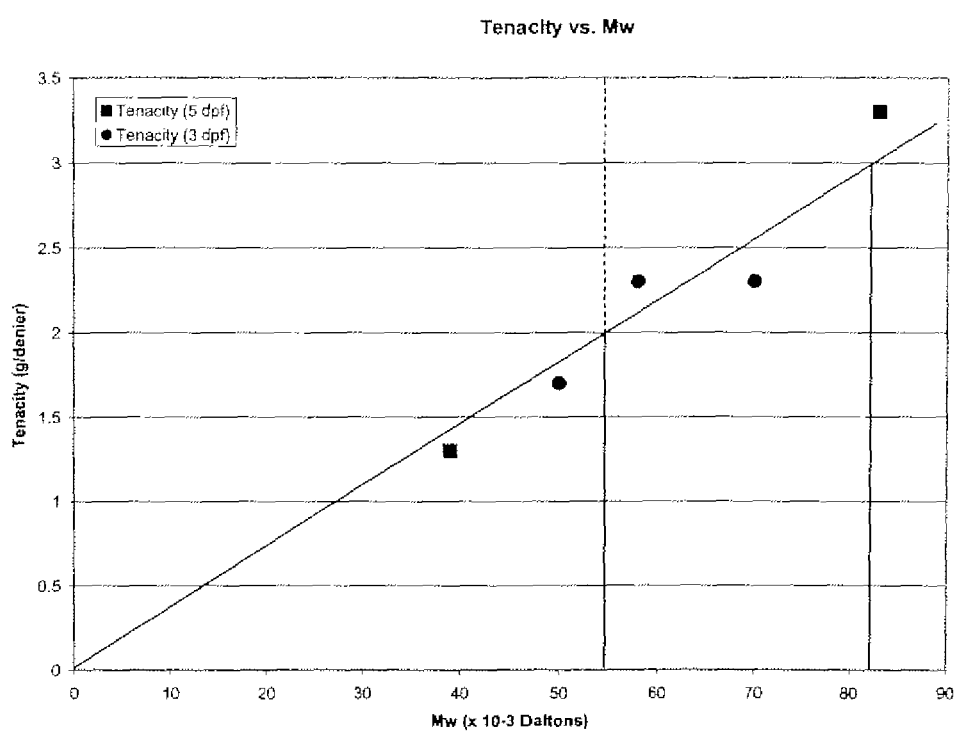
FIG. 2 is a graph depicting the relationship between the Tenacity of the inventive fiber measured in g/denier and Molecular Weight ($M_w$) of the inventive polyethylene composition measured in $10^3$ Daltons.
Figure 3:
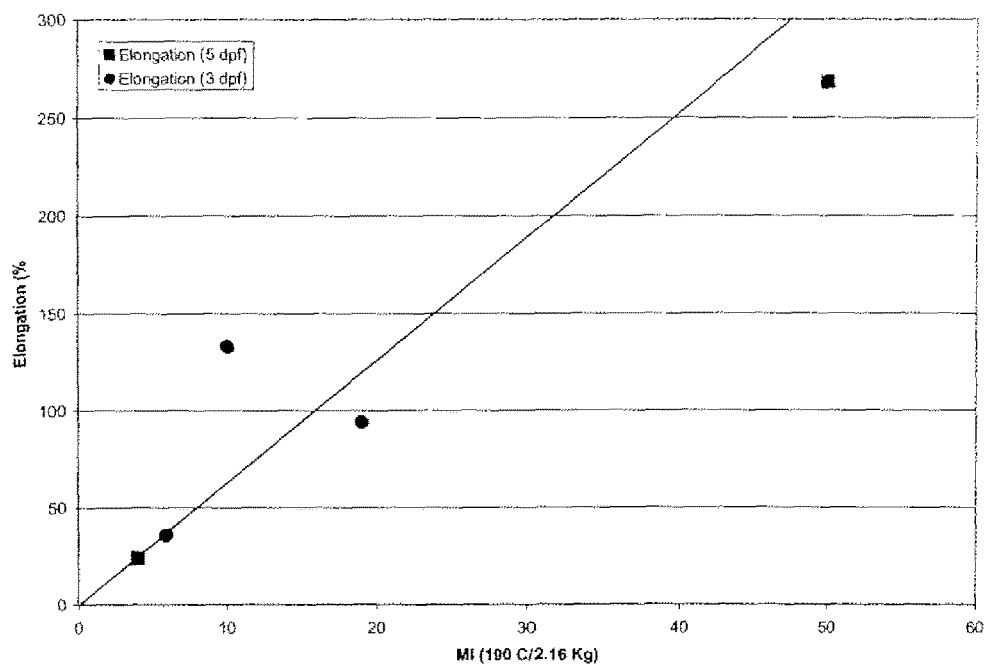
FIG. 3 is a graph depicting the relationship between the Elongation of the inventive fiber measured in percent and Melt Index ($I_2$) of the inventive polyethylene composition measured in g/10 minutes.
Figure 4:
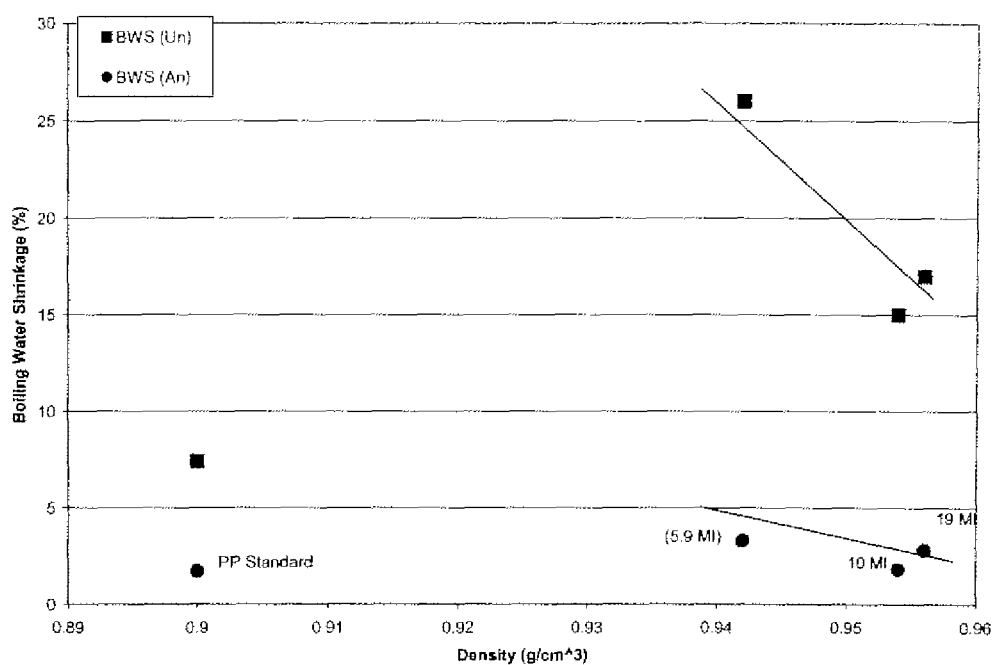
FIG. 4 is a graph depicting the relationship between the Boiling Water Shrinkage of the annealed (An) at 120° C. and unannealed (Un) inventive fiber measured in percent and Density of the inventive polyethylene composition measured in g/cm$^3$.

The instant invention relates to polyethylene compositions, method of producing the same, fibers made therefrom, and method of making the same. The polyethylene composition according to instant invention comprises: (a) less than or equal to 100 percent by weight of the units derived from ethylene; and (b) less than 20 percent by weight of units derived from one or more α-olefin comonomers. The polyethylene composition according to instant invention has a density in the range of 0.920 to 0.970 g/cm$^3$, a molecular weight distribution ($M_w/M_n$) in the range of 1.70 to 3.5, a melt index ($I_2$) in the range of 0.2 to 1000 g/10 minutes, a molecular weight distribution ($M_z/M_w$) in the range of less than 2.5, vinyl unsaturation of less than 0.1 vinyls per one thousand carbon atoms present in the backbone of the composition.

The polyethylene composition according to instant invention possesses unique properties and differentiated performance in different applications, as described in further details hereinbelow.

The term (co)polymerization, as used herein, refers to the polymerization of ethylene and optionally one or more comonomers, e.g. one or more α-olefin comonomers. Thus, the term (co)polymerization refers to both polymerization of ethylene and copolymerization of ethylene and one or more comonomers, e.g. one or more α-olefin comonomers.

The polyethylene composition according to instant invention has a density in the range of 0.920 to 0.970 g/cm$^3$. All individual values and subranges from 0.920 to 0.970 g/cm$^3$ are included herein and disclosed herein; for example, the density can be from a lower limit of 0.920, 0.923, 0.928, 0.930, 0.936, or 0.940 g/cm$^3$ to an upper limit of 0.941, 0.947, 0.954, 0.955, 0.959, 0.960, 0.965, 0.968, or 0.970 g/cm$^3$. For example, the polyethylene composition may have a density in the range of 0.920 to 0.965 g/cm$^3$; or in the alternative, the polyethylene composition may have a density in the range of 0.920 to 0.960 g/cm$^3$; or in the alternative, the polyethylene composition may have a density in the range of 0.920 to 0.955 g/cm$^3$; or in the alternative, the polyethylene composition may have a density in the range of 0.920 to 0.950 g/cm$^3$; or in the alternative, the polyethylene composition may have a density in the range of 0.930 to 0.965 g/cm$^3$; or in the alternative, the polyethylene composition may have a density in the range of 0.930 to 0.960 g/cm$^3$; or in the alternative, the polyethylene composition may have a density in the range of 0.930 to 0.955 g/cm$^3$; or in the alternative, the polyethylene composition may have a density in the range of 0.930 to 0.950 g/cm$^3$; or in the alternative, the polyethylene composition may have a density in the range of 0.940 to 0.965 g/cm$^3$; or in the alternative, the polyethylene composition may have a density in the range of 0.940 to 0.960 g/cm$^3$; or in the alternative, the polyethylene composition may have a density in the range of 0.940 to 0.955 g/cm$^3$; or in the alternative, the polyethylene composition may have a density in the range of 0.940 to 0.950 g/cm$^3$.

The polyethylene composition according to the instant invention has a molecular weight distribution ($M_w/M_n$) in the range of 1.70 to 3.62. All individual values and subranges from 1.70 to 3.62 are included herein and disclosed herein; for example, the molecular weight distribution ($M_w/M_n$) can be from a lower limit of 1.70, 1.80, 1.90, 2.10, 2.30, 2.50, 2.70, 2.90, 3.10, 3.30, or 3.50 to an upper limit of 1.85, 1.95, 2.15, 2.35, 2.55, 2.75, 2.95, 3.15, 3.35, 3.50, 3.55, 3.60, or 3.62. For example, the polyethylene composition may have a molecular weight distribution ($M_w/M_n$) in the range of 1.70 to 3.60; or in the alternative, the polyethylene composition may have a molecular weight distribution ($M_w/M_n$) in the range of 1.70 to 3.55; or in the alternative, the polyethylene composition may have a molecular weight distribution ($M_w/M_n$) in the range of 1.70 to 3.50; or in the alternative, the polyethylene composition may have a molecular weight distribution ($M_w/M_n$) in the range of 1.70 to 3.35; or in the alternative, the polyethylene composition may have a molecular weight distribution ($M_w/M_n$) in the range of 1.70 to 3.15; or in the alternative, the polyethylene composition may have a molecular weight distribution ($M_w/M_n$) in the range of 1.70 to 2.95; or in the alternative, the polyethylene composition may have a molecular weight distribution ($M_w/M_n$) in the range of 1.70 to 2.75; or in the alternative, the polyethylene composition may have a molecular weight distribution ($M_w/M_n$) in the range of 1.70 to 2.55; or in the alternative, the polyethylene composition may have a molecular weight distribution ($M_w/M_n$) in the range of 1.70 to 2.35; or in the alternative, the polyethylene composition may have a molecular weight distribution ($M_w/M_n$) in the range of 1.70 to 2.15; or in the alternative, the polyethylene composition may have a molecular weight distribution ($M_w/M_n$) in the range of 1.70 to 1.95; or in the alternative, the polyethylene composition may have a molecular weight distribution ($M_w/M_n$) in the range of 1.70 to 1.85.

The polyethylene composition according to the instant invention has a melt index ($I_2$) in the range of 0.1 to 1000 g/10 minutes. All individual values and subranges from 0.1 to 1000 g/10 minutes are included herein and disclosed herein; for example, the melt index ($I_2$) can be from a lower limit of 0.1, 0.2, 0.5, 1, 2, 3, 5, 10, 20, 30, 40, 60, 80, or 100 g/10 minutes, to an upper limit of 5, 10, 30, 35, 50, 80, 90, 100, 110, 150, 200, 220, 250, 300, 500, 800, or 1000 g/10 minutes. For example, the polyethylene composition may have a melt index ($I_2$) in the range of 1 to 150 g/10 minutes; or in the alternative, the polyethylene composition may have a melt index ($I_2$) in the range of 1 to 50 g/10 minutes; or in the alternative, the polyethylene composition may have a melt index ($I_2$) in the range of 1 to 35 g/10 minutes; or in the alternative, the polyethylene composition may have a melt index ($I_2$) in the range of 1 to 30 g/10 minutes; or in the alternative, the polyethylene composition may have a melt index ($I_2$) in the range of 1 to 20 g/10 minutes; or in the alternative, the polyethylene composition may have a melt index ($I_2$) in the range of 1 to 10 g/10 minutes; or in the alternative, the polyethylene composition may have a melt index ($I_2$) in the range of 3 to 150 g/10 minutes; or in the alternative, the polyethylene composition may have a melt index ($I_2$) in the range of 3 to 50 g/10 minutes; or in the alternative, the polyethylene composition may have a melt index ($I_2$) in the range of 3 to 35 g/10 minutes; or in the alternative, the polyethylene composition may have a melt index ($I_2$) in the range of 3 to 30 g/10 minutes; or in the alternative, the polyethylene composition may have a melt index ($I_2$) in the range of 3 to 20 g/10 minutes; or in the alternative, the polyethylene composition may have a melt index ($I_2$) in the range of 3 to 10 g/10 minutes.

The polyethylene composition according to the instant invention has a melt flow rate ($I_{21}$) in the range of 2 to 20,000 g/10 minutes. All individual values and subranges from 2 to 20,000 g/10 minutes are included herein and disclosed herein; for example, the melt flow rate ($I_{21}$) can be from a lower limit of 3.4, 4.3, 6.0, 10, 20, 50, 100, 150, 300, or 500 g/10 minutes, to an upper limit of 20,000, 15,000, 10,000, 5,000, 1,200, 1,000, 800, 700, 600, 500, 400, 300, 250, 200, 100, 80, 70, or 50 g/10 minutes. For example, the polyethylene composition may have a melt flow rate ($I_{21}$) in the range of 3.4 to 1200 g/10 minutes; or in the alternative, the polyethylene composition may have a melt flow rate ($I_{21}$) in the range of 3.4 to 1,000 g/10 minutes; or in the alternative, the polyethylene composition may have a melt flow rate ($I_{21}$) in the range of 3.4 to 500 g/10 minutes; or in the alternative, the polyethylene composition may have a melt flow rate ($I_{21}$) in the range of 3.4 to 400 g/10 minutes; or in the alternative, the polyethylene composition may have a melt flow rate ($I_{21}$) in the range of 3.4 to 300 g/10 minutes; or in the alternative, the polyethylene composition may have a melt flow rate ($I_{21}$) in the range of 3.4 to 250 g/10 minutes.

The polyethylene composition according to the instant invention has a melt flow ratio ($I_{21}/I_2$) in the range of 17 to 24. All individual values and subranges from 17 to 24 minutes are included herein and disclosed herein; for example, the melt flow ratio ($I_{21}/I_2$) can be from a lower limit of 17, 17.5, 18, 18.5, 19, 19.5, 20, 20.5, 21, 21.5, 22, 22.5, or 23.5 to an upper limit of 18, 18.5, 19, 19.5, 20, 20.5, 21, 21.5, 22, 22.5, 23.5 or 24. For example, the polyethylene composition may have a melt flow ratio ($I_{21}/I_2$) in the range 17 to 23; or in the alternative, the polyethylene composition may have a melt flow ratio ($I_{21}/I_2$) in the range 17 to 22; or in the alternative, the polyethylene composition may have a melt flow ratio ($I_{21}/I_2$) in the range 18 to 24; or in the alternative, the polyethylene composition may have a melt flow ratio ($I_{21}/I_2$) in the range 18 to 23; or in the alternative, the polyethylene composition may have a melt flow ratio ($I_{21}/I_2$) in the range 19 to 24; or in the alternative, the polyethylene composition may have a melt flow ratio ($I_{21}/I_2$) in the range 19 to 23; or in the alternative, the polyethylene composition may have a melt flow ratio ($I_{21}/I_2$) in the range 21 to 24; or in the alternative, the polyethylene composition may have a melt flow ratio ($I_{21}/I_2$) in the range 21 to 23.

The polyethylene composition according to the instant invention has a molecular weight ($M_w$) in the range of 15,000 to 150,000 daltons. All individual values and subranges from 15,000 to 150,000 daltons are included herein and disclosed herein; for example, the molecular weight ($M_w$) can be from a lower limit of 15,000, 20,000, 25,000, 30,000, 34,000, 40,000, 50,000, 60,000, 70,000, 80,000, 90,000, 95,000, or 100,000 daltons to an upper limit of 20,000, 25,000, 30,000, 33,000, 40,000, 50,000, 60,000, 70,000, 80,000, 90,000, 95,000, 100,000, 115,000, 125,000, or 150,000. For example, the polyethylene composition may have a molecular weight ($M_w$) in the range of 15,000 to 125,000 daltons; or in the alternative, the polyethylene composition may have a molecular weight ($M_w$) in the range of 15,000 to 115,000 daltons; or in the alternative, the polyethylene composition may have a molecular weight ($M_w$) in the range of 15,000 to 100,000 daltons; or in the alternative, the polyethylene composition may have a molecular weight ($M_w$) in the range of 20,000 to 150,000 daltons; or in the alternative, the polyethylene composition may have a molecular weight ($M_w$) in the range of 30,000 to 150,000 daltons; or in the alternative, the polyethylene composition may have a molecular weight ($M_w$) in the range of 40,000 to 150,000 daltons; or in the alternative, the polyethylene composition may have a molecular weight ($M_w$) in the range of 50,000 to 150,000 daltons; or in the alternative, the polyethylene composition may have a molecular weight ($M_w$) in the range of 60,000 to 150,000 daltons; or in the alternative, the polyethylene composition may have a molecular weight ($M_w$) in the range of 80,000 to 150,000 daltons.

The polyethylene composition may have molecular weight distribution ($M_z/M_w$) in the range of less than 5. All individual values and subranges from less than 5 are included herein and disclosed herein; for example, the polyethylene composition may have a molecular weight distribution ($M_z/M_w$) in the range of less than 4.5; or in the alternative, the polyethylene composition may have a molecular weight distribution ($M_z/M_w$) in the range of less than 4; or in the alternative, the polyethylene composition may have a molecular weight distribution ($M_z/M_w$) in the range of less than 3.5; or in the alternative, the polyethylene composition may have a molecular weight distribution ($M_z/M_w$) in the range of less than 3.0; or in the alternative, the polyethylene composition may have a molecular weight distribution ($M_z/M_w$) in the range of less than 2.8; or in the alternative, the polyethylene composition may have a molecular weight distribution ($M_z/M_w$) in the range of less than 2.6; or in the alternative, the polyethylene composition may have a molecular weight distribution ($M_z/M_w$) in the range of less than 2.5; or in the alternative, the polyethylene composition may have a molecular weight distribution ($M_z/M_w$) in the range of less than 2.4; or in the alternative, the polyethylene composition may have a molecular weight distribution ($M_z/M_w$) in the range of less than 2.3; or in the alternative, the polyethylene composition may have a molecular weight distribution ($M_z/M_w$) in the range of less than 2.2.

The polyethylene composition may have a vinyl unsaturation of less than 0.1 vinyls per one thousand carbon atoms present in the backbone of the polyethylene composition. All individual values and subranges from less than 0.1 are included herein and disclosed herein; for example, the polyethylene composition may have a vinyl unsaturation of less than 0.08 vinyls per one thousand carbon atoms present in the backbone of the polyethylene composition; or in the alternative, the polyethylene composition may have a vinyl unsaturation of less than 0.06 vinyls per one thousand carbon atoms present in the backbone of the polyethylene composition; or in the alternative, the polyethylene composition may have a vinyl unsaturation of less than 0.04 vinyls per one thousand carbon atoms present in the backbone of the polyethylene composition; or in the alternative, the polyethylene composition may have a vinyl unsaturation of less than 0.02 vinyls per one thousand carbon atoms present in the backbone of the polyethylene composition; or in the alternative, the polyethylene composition may have a vinyl unsaturation of less than 0.01 vinyls per one thousand carbon atoms present in the backbone of the polyethylene composition; or in the alternative, the polyethylene composition may have a vinyl unsaturation of less than 0.001 vinyls per one thousand carbon atoms present in the backbone of the polyethylene composition.

The polyethylene composition may comprise less than 25 percent by weight of units derived from one or more α-olefin comonomers. All individual values and subranges from less than 25 weight percent are included herein and disclosed herein; for example, the polyethylene composition may comprise less than 20 percent by weight of units derived from one or more α-olefin comonomers; or in the alternative, the polyethylene composition may comprise less than 15 percent by weight of units derived from one or more α-olefin comonomers; or in the alternative, the polyethylene composition may comprise less than 12 percent by weight of units derived from one or more α-olefin comonomers; or in the alternative, the polyethylene composition may comprise less than 11 percent by weight of units derived from one or more α-olefin comonomers; or in the alternative, the polyethylene composition may comprise less than 9 percent by weight of units derived from one or more α-olefin comonomers; or in the alternative, the polyethylene composition may comprise less than 7 percent by weight of units derived from one or more α-olefin comonomers; or in the alternative, the polyethylene composition may comprise less than 5 percent by weight of units derived from one or more α-olefin comonomers; or in the alternative, the polyethylene composition may comprise less than 3 percent by weight of units derived from one or more α-olefin comonomers; or in the alternative, the polyethylene composition may comprise less than 1 percent by weight of units derived from one or more α-olefin comonomers; or in the alternative, the polyethylene composition may comprise less than 0.5 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The polyethylene composition may comprise at least 75 percent by weight of units derived from ethylene. All individual values and subranges from at least 75 weight percent are included herein and disclosed herein; the polyethylene composition may comprise at least 80 percent by weight of units derived from ethylene; or in the alternative, for example, the polyethylene composition may comprise at least 85 percent by weight of units derived from ethylene; or in the alternative, the polyethylene composition may comprise at least 88 percent by weight of units derived from ethylene; or in the alternative, the polyethylene composition may comprise at least 89 percent by weight of units derived from ethylene; or in the alternative, the polyethylene composition may comprise at least 91 percent by weight of units derived from ethylene; or in the alternative, the polyethylene composition may comprise at least 93 percent by weight of units derived from ethylene; or in the alternative, the polyethylene composition may comprise at least 95 percent by weight of units derived from ethylene; or in the alternative, the polyethylene composition may comprise at least 97 percent by weight of units derived from ethylene; or in the alternative, the polyethylene composition may comprise at least 99 percent by weight of units derived from ethylene; or in the alternative, the polyethylene composition may comprise at least 99.5 percent by weight of units derived from ethylene.

The polyethylene composition of the instant invention is substantially free of any long chain branching, and preferably, the polyethylene composition of the instant invention is free of any long chain branching. Substantially free of any long chain branching, as used herein, refers to a polyethylene composition preferably substituted with less than about 0.1 long chain branching per 1000 total carbons, and more preferably, less than about 0.01 long chain branching per 1000 total carbons. In the alternative, the polyethylene composition of the instant invention is free of any long chain branching.

The polyethylene composition may have a short chain branching distribution breadth (SCBDB) in the range of 2 to 40° C. All individual values and subranges from 2 to 40° C. are included herein and disclosed herein; for example, the short chain branching distribution breadth (SCBDB) can be from a lower limit of 2, 3, 4, 5, 6, 8, 10, 12, 15, 18, 20, 25, or 30° C. to an upper limit of 40, 35, 30, 29, 27, 25, 22, 20, 15, 12, 10, 8, 6, 4, or 3° C. For example, the polyethylene composition may have a short chain branching distribution breadth (SCBDB) in the range of 2 to 35° C.; or in the alternative, the polyethylene composition may have a short chain branching distribution breadth (SCBDB) in the range of 2 to 30° C.; or in the alternative, the polyethylene composition may have a short chain branching distribution breadth (SCBDB) in the range of 2 to 25° C.; or in the alternative, the polyethylene composition may have a short chain branching distribution breadth (SCBDB) in the range of 2 to 20° C.; or in the alternative, the polyethylene composition may have a short chain branching distribution breadth (SCBDB) in the range of 2 to 15° C.; or in the alternative, the polyethylene composition may have a short chain branching distribution breadth (SCBDB) in the range of 2 to 10° C.; or in the alternative, the polyethylene composition may have a short chain branching distribution breadth (SCBDB) in the range of 2 to 5° C.; or in the alternative, the polyethylene composition may have a short chain branching distribution breadth (SCBDB) in the range of 4 to 35° C.; or in the alternative, the polyethylene composition may have a short chain branching distribution breadth (SCBDB) in the range of 4 to 30° C.; or in the alternative, the polyethylene composition may have a short chain branching distribution breadth (SCBDB) in the range of 4 to 25° C.; or in the alternative, the polyethylene composition may have a short chain branching distribution breadth (SCBDB) in the range of 4 to 20° C.; or in the alternative, the polyethylene composition may have a short chain branching distribution breadth (SCBDB) in the range of 4 to 15° C.; or in the alternative, the polyethylene composition may have a short chain branching distribution breadth (SCBDB) in the range of 4 to 10° C.; or in the alternative, the polyethylene composition may have a short chain branching distribution breadth (SCBDB) in the range of 4 to 5° C. In the alternative, the polyethylene composition may have a short chain branching distribution breadth (SCBDB) in the range less than ((0.0312)(melt index ($I_2$)+ 2.87) ° C.

The inventive polyethylene composition may have a shear viscosity in the range of 20 to 250 Pascal-s at 3000 $s^{-1}$ shear rate measured at 190° C. All individual values and subranges from 20 to 250 Pascal-s at 3000 $s^{-1}$ shear rate measured at 190° C. are included herein and disclosed herein; for example, the polyethylene composition may have a shear viscosity in the range of 20 to 200 Pascal-s at 3000 $s^{-1}$ shear rate measured at 190° C.; or in the alternative, the polyethylene composition may have a shear viscosity in the range of 20 to 150 Pascal-s at 3000 $s^{-1}$ shear rate measured at 190° C.; or in the alternative, the polyethylene composition may have a shear viscosity in the range of 20 to 130 Pascal-s at 3000 $s^{-1}$ shear rate measured at 190° C.; or in the alternative, the polyethylene composition may have a shear viscosity in the range of 25 to 150 Pascal-s at 3000 $s^{-1}$ shear rate measured at 190° C.; or in the alternative, the polyethylene composition may have a shear viscosity in the range of 25 to 80 Pascal-s at 3000 $s^{-1}$ shear rate measured at 190° C.; or in the alternative, the polyethylene composition may have a shear viscosity in the range of 25 to 55 Pascal-s at 3000 $s^{-1}$ shear rate measured at 190° C.; or in the alternative, the polyethylene composition may have a shear viscosity in the range of 25 to 50 Pascal-s at 3000 $s^{-1}$ shear rate measured at 190° C.; or in the alternative, the polyethylene composition may have a shear viscosity in the range of 25 to 45 Pascal-s at 3000 $s^{-1}$ shear rate measured at 190° C.; or in the alternative, the polyethylene composition may have a shear viscosity in the range of 25 to 45 Pascal-s at 3000 $s^{-1}$ shear rate measured at 190° C.; or in the alternative, the polyethylene composition may have a shear viscosity in the range of 25 to 35 Pascal-s at 3000 $s^{-1}$ shear rate measured at 190° C.; or in the alternative, the polyethylene composition may have a shear viscosity in the range of 25 to 30 Pascal-s at 3000 $s^{-1}$ shear rate measured at 190° C.; or in the alternative, the polyethylene composition may have a shear viscosity in the range of 30 to 55 Pascal-s at 3000 $s^{-1}$ shear rate measured at 190° C.; or in the alternative, the polyethylene composition may have a shear viscosity in the range of 35 to 55 Pascal-s at 3000 $s^{-1}$ shear rate measured at 190° C.; or in the alternative, the polyethylene composition may have a shear viscosity in the range of 40 to 55 Pascal-s at 3000 $s^{-1}$ shear rate measured at 190° C.; or in the alternative, the polyethylene composition may have a shear viscosity in the range of 45 to 55 Pascal-s at 3000 $s^{-1}$ shear rate measured at 190° C.; or in the alternative, the polyethylene composition may have a shear viscosity in the range of 50 to 55 Pascal-s at 3000 $s^{-1}$ shear rate measured at 190° C.

The inventive polyethylene composition may further comprise less than or equal to 100 parts by weight of hafnium residues remaining from the hafnium based metallocene catalyst per one million parts of polyethylene composition. All individual values and subranges from less than or equal to 100 ppm are included herein and disclosed herein; for example, the polyethylene composition may further comprise less than or equal to 10 parts by weight of hafnium residues remaining from the hafnium based metallocene catalyst per one million parts of polyethylene composition; or in the alternative, the polyethylene composition may further comprise less than or equal to 8 parts by weight of hafnium residues remaining from the hafnium based metallocene catalyst per one million parts of polyethylene composition; or in the alternative, the polyethylene composition may further comprise less than or equal to 6 parts by weight of hafnium residues remaining from the hafnium based metallocene catalyst per one million parts of polyethylene composition; or in the alternative, the polyethylene composition may further comprise less than or equal to 4 parts by weight of hafnium residues remaining from the hafnium based metallocene catalyst per one million parts of polyethylene composition; or in the alternative, the polyethylene composition may further comprise less than or equal to 2 parts by weight of hafnium residues remaining from the hafnium based metallocene catalyst per one million parts of polyethylene composition; or in the alternative, the polyethylene composition may further comprise less than or equal to 1.5 parts by weight of hafnium residues remaining from the hafnium based metallocene catalyst per one million parts of polyethylene composition; or in the alternative, the polyethylene composition may further comprise less than or equal to 1 parts by weight of hafnium residues remaining from the hafnium based metallocene catalyst per one million parts of polyethylene composition; or in the alternative, the polyethylene composition may further comprise less than or equal to 0.75 parts by weight of hafnium residues remaining from the hafnium based metallocene catalyst per one million parts of polyethylene composition; or in the alternative, the polyethylene composition may further comprise less than or equal to 0.5 parts by weight of hafnium residues remaining from the hafnium based metallocene catalyst per one million parts of polyethylene composition the polyethylene composition may further comprise from 0.1 to 100 parts by weight of hafnium residues remaining from the hafnium based metallocene catalyst per one million parts of polyethylene composition. The hafnium residues remaining from the hafnium based metallocene catalyst in the inventive polyethylene composition may be measured by x-ray fluorescence (XRF), which is calibrated to reference standards. The polymer resin granules were compression molded at elevated temperature into plaques having a thickness of about ⅜ of an inch for the x-ray measurement in a preferred method. At very low concentrations of metal, such as below 0.1 ppm, ICP-AES would be a suitable method to determine metal residues present in the inventive polyethylene composition. In one embodiment, the inventive polyethylene composition has substantially no chromium, zirconium or titanium content, that is, no or only what would be considered by those skilled in the art, trace amounts of these metals are present, such as, for example, less than 0.001 ppm.

The inventive polyethylene composition in accordance with the instant invention may have less than 2 peaks on an elution temperature-eluted amount curve determined by continuous temperature rising elution fraction method at equal or above 30° C., wherein the purge peak which is below 30° C. is excluded. In the alternative, the polyethylene composition may have only 1 peak or less on an elution temperature-eluted amount curve determined by continuous temperature rising elution fraction method at equal or above 30° C., wherein the purge peak which is below 30° C. is excluded. In the alternative, the polyethylene composition may have only 1 peak on an elution temperature-eluted amount curve determined by continuous temperature rising elution fraction method at equal or above 30° C., wherein the purge peak which is below 30° C. is excluded. In addition, artifacts generated due to instrumental noise at either side of a peak are not considered to be peaks.

The inventive polyethylene composition may further comprise additional components such as one or more other polymers and/or one or more additives. Such additives include, but are not limited to, antistatic agents, color enhancers, dyes, lubricants, fillers, pigments, primary antioxidants, secondary antioxidants, processing aids, UV stabilizers, anti-blocks, slip agents, tackifiers, fire retardants, anti-microbial agents, odor reducer agents, anti fungal agents, and combinations thereof. The inventive polyethylene composition may contain any amounts of additives. The inventive polyethylene composition may comprise from about 0.1 to about 10 percent by the combined weight of such additives, based on the weight of the inventive polyethylene composition including such additives. All individual values and subranges from about 0.1 to about 10 weight percent are included herein and disclosed herein; for example, the inventive polyethylene composition may comprise from 0.1 to 7 percent by the combined weight of additives, based on the weight of the inventive polyethylene composition including such additives; in the alternative, the inventive polyethylene composition may comprise from 0.1 to 5 percent by the combined weight of additives, based on the weight of the inventive polyethylene composition including such additives; or in the alternative, the inventive polyethylene composition may comprise from 0.1 to 3 percent by the combined weight of additives, based on the weight of the inventive polyethylene composition including such additives; or in the alternative, the inventive polyethylene composition may comprise from 0.1 to 2 percent by the combined weight of additives, based on the weight of the inventive polyethylene composition including such additives; or in the alternative, the inventive polyethylene composition may comprise from 0.1 to 1 percent by the combined weight of additives, based on the weight of the inventive polyethylene composition including such additives; or in the alternative, the inventive polyethylene composition may comprise from 0.1 to 0.5 percent by the combined weight of additives, based on the weight of the inventive polyethylene composition including such additives. Antioxidants, such as Irgafos™ 168, Irganox™ 3114, Cyanox™ 1790, Irganox™ 1010, Irganox™ 1076, Irganox™1330, Irganox™1425WL, Irgastab™ may be used to protect the inventive polyethylene composition from thermal and/or oxidative degradation. Irganox™ 1010 is tetrakis (methylene (3,5-di-tert-butyl-4 hydroxyhydrocinnamate), commercially available from Ciba Geigy Inc.; Irgafos™ 168 is tris (2,4 di-tert-butylphenyl) phosphite, commercially available from Ciba Geigy Inc.; Irganox™ 3114 is [1,3,5-Tris(3,5-di-(tert)-butyl-4-hydroxybenzyl)-1,3,5-triazine-2,4,6(1H,3H,5H)-trione], commercially available from Ciba Geigy Inc.; Irganox™ 1076 is (Octadecyl 3,5-di-tert-butyl-4 hydroxycinnamate), commercially available from Ciba Geigy Inc.; Irganox™1330 is [1,3,5-Trimethyl-2,4,6-tris(3,5-di-tert-butyl-4-hydroxybenzyl)benzene], commercially available from Ciba Geigy Inc.; Irganox™1425WL is (Calcium bis[fluoriding(3,5-di-(tert)-butyl-4-hydroxybenzyl)phosphonate]), commercially available from Ciba Geigy Inc.; Irgastab™ is [bis(hydrogenated tallow alkyl)amines, oxidized], commercially available from Ciba Geigy Inc.; Cyanox™ 1790 is [Tris (4-t-butyl-3-hydroxy-2,6-dimethylbenzyl)-s-triazine-2,4,6-(1H,3H,5H)-trione], commercially available from Cytec Industries, Inc. Other commercially available antioxidants include, but are not limited to, Ultranox™ 626, a Bis (2, 4-di-t-butylphenyl) Pentaerythritol Diphosphite, commercially available from Chemtura Corporation; P-EPQ™, a Phosphonous acid, P,P'-[[1,1'-biphenyl]-4,4'-diyl]bis-, P,P,P',P'-tetrakis[2,4-bis(1,1-dimethylethyl)phenyl] ester, commercially available from Clariant Corporation; Doverphos™ 9228, a Bis (2, 4-decumylphenyl) Pentaerythritol Diphosphite, commercially available from Dover Chemical Corporation; Chimassorb™ 944, a Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]], commercially available from Ciba Geigy Inc.; Chimassorb™ 119, a 1,3,5-Triazine-2,4,6-triamine, N2,N2'-1,2-ethanediylbis[N2-[3-[[4,6-bis[butyl(1,2,2,6,6-pentamethyl-4-piperidinyl)amino]-1,3,5-triazin-2-yl]amino]propyl]-N4, N6-dibutyl-N4,N6-bis(1,2,2,6,6-pentamethyl-4-piperidinyl)-, commercially available from Ciba Geigy Inc.; Chimassorb™ 2020, a Poly[[6-[butyl(2,2,6,6-tetramethyl-4-piperidinyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]], α-[[6-[[4,6-bis(dibutylamino)-1,3,5-triazin-2-yl](2,2,6,6-tetramethyl-4-piperidinyl)amino] hexyl](2,2,6,6-tetramethyl-4-piperidinyl)amino]-ω-[4,6-bis(dibutylamino)-1,3,5-triazin-2-yl]-, commercially available from Ciba Geigy Inc.; Tinuvin™ 622, a Butanedioic acid polymer with 4-hydroxy-2,2,6,6-tetramethyl-1-piperidineethanol, commercially available from Ciba Geigy Inc.; Tinuvin™ 770, a Decanedioic acid, 1,10-bis(2,2,6,6-tetramethyl-4-piperidinyl) ester, commercially available from Ciba Geigy Inc.; Uvasorb HA™ 88, a 2,5-Pyrrolidinedione, 3-dodecyl-1-(2,2,6,6-tetramethyl-4-piperidinyl), commercially available from 3V; CYASORB™ UV-3346, a Poly[[6-(4-morpholinyl)-1,3,5-triazine-2,4-diyl][(2,2,6,6-tetramethyl-4-piperidinyl)imino]-1,6-hexanediyl[(2,2,6,6-tetramethyl-4-piperidinyl)imino]], commercially available from Cytec Industries, Inc.; CYASORB™ UV-3529, a Poly[[6-(4-morpholinyl)-1,3,5-triazine-2,4-diyl][(1,2,2,6,6-pentamethyl-4-piperidinyl)imino]-1,6-hexanediyl[(1,2,2,6,6-pentamethyl-4-piperidinyl)imino]], commercially available from Cytec Industries, Inc.; and Hostavin™ N 30, a 7-Oxa-3,20-iazadispiro[5.1.11.2]heneicosan-21-one, 2,2,4,4-tetramethyl-20-(2-oxiranylmethyl)-, polymer with 2-(chloromethyl)oxirane, commercially available from Clariant Corporation.

Any conventional ethylene (co)polymerization reaction processes may be employed to produce the inventive polyethylene composition. Such conventional ethylene (co)polymerization reaction processes include, but are not limited to, gas phase polymerization process, slurry phase polymerization process, liquid phase polymerization process, and combinations thereof using one or more conventional reactors, e.g. fluidized bed gas phase reactors, loop reactors, stirred tank reactors, batch reactors in parallel, series, and/or any combinations thereof. In the alternative, the inventive polyethylene composition may be produced in a high pressure reactor via a coordination catalyst system. For example, the inventive polyethylene composition may be produced via gas phase polymerization process in a single gas phase reactor; however, the instant invention is not so limited, and any of the above polymerization processes may be employed. In one embodiment, the polymerization reactor may comprise of two or more reactors in series, parallel, or combinations thereof. Preferably, the polymerization reactor is a single reactor, e.g. a fluidized bed gas phase reactor. In another embodiment, the gas phase polymerization reactor is a continuous polymerization reactor comprising one or more feed streams. In the polymerization reactor, the one or more feed streams are combined together, and the gas comprising ethylene and optionally one or more comonomers, e.g. one or more α-olefins, are flowed or cycled continuously through the polymerization reactor by any suitable means. The gas comprising ethylene and optionally one or more comonomers, e.g. one or more α-olefins, may be fed up through a distributor plate to fluidize the bed in a continuous fluidization process.

In production, a hafnium based metallocene catalyst system including a cocatalyst, as described hereinbelow in further details, ethylene, optionally one or more alpha-olefin comonomers, hydrogen, optionally one or more inert gases and/or liquids, e.g. $N_2$, isopentane, and hexane, and optionally one or more continuity additive, e.g. ethoxylated stearyl amine or aluminum distearate or combinations thereof, are continuously fed into a reactor, e.g. a fluidized bed gas phase reactor. The reactor may be in fluid communication with one or more discharge tanks, surge tanks, purge tanks, and/or recycle compressors. The temperature in the reactor is typically in the range of 70 to 115° C., preferably 75 to 110° C., more preferably 75 to 100° C., and the pressure is in the range of 15 to 30 atm, preferably 17 to 26 atm. A distributor plate at the bottom of the polymer bed provides a uniform flow of the upflowing monomer, comonomer, and inert gases stream. A mechanical agitator may also be provided to facilitate contact between the solid particles and the comonomer gas stream. The fluidized bed, a vertical cylindrical reactor, may have a bulb shape at the top to facilitate the reduction of gas velocity; thus, permitting the granular polymer to separate from the upflowing gases. The unreacted gases are then cooled to remove the heat of polymerization, recompressed, and then recycled to the bottom of the reactor. Once resin is removed from the reactor, it is transported to a purge bin to purge the residual hydrocarbons. Moisture may be introduced to react with residual catalyst and co-catalyst prior to exposure and reaction with oxygen. The inventive polyethylene composition may then be transferred to an extruder to be pelletized. Such pelletization techniques are generally known. The inventive polyethylene composition may further be melt screened. Subsequent to the melting process in the extruder, the molten composition is passed through one or more active screens, positioned in series of more than one, with each active screen having a micron retention size of from about 2 m to about 400 m (2 to $4 \times 10^{-5}$ m), and preferably about 2 μm to about 300 μm (2 to $3 \times 10^{-5}$ m), and most preferably about 2 m to about 70 m (2 to $7 \times 10^{-6}$ m), at a mass flux of about 5 to about 100 lb/hr/in$^2$ (1.0 about 20 kg/s/m$^2$). Such further melt screening is disclosed in U.S. Pat. No. 6,485,662, which is incorporated herein by reference to the extent that it discloses melt screening.

In an embodiment of a fluidized bed reactor, a monomer stream is passed to a polymerization section. The fluidized bed reactor may include a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and optionally one or more α-olefin comonomers, and may also include condensing agents as is known in the art and disclosed in, for example, U.S. Pat. Nos. 4,543,399, 5,405, 922, and 5,462,999.

The fluidized bed has the general appearance of a dense mass of individually moving particles, preferably polyethylene particles, as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.5 m/sec and usually no more than 0.76 m/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. The gas exiting the overhead of the reactor is the recycle gas stream.

The recycle stream is compressed in a compressor and then passed through a heat exchange zone where heat is removed before the stream is returned to the bed. The heat exchange zone is typically a heat exchanger, which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes that contain liquid in the cycle gas stream and those that do not and vice versa. Such deflectors are described in the U.S. Pat. Nos. 4,933,149 and 6,627,713.

The hafnium based catalyst system used in the fluidized bed is preferably stored for service in a reservoir under a blanket of a gas, which is inert to the stored material, such as nitrogen or argon. The hafnium based catalyst system is injected into the bed at a point above distributor plate. Preferably, the hafnium based catalyst system is injected at a point in the bed where good mixing with polymer particles occurs. Injecting the hafnium based catalyst system at a point above the distribution plate facilitates the operation of a fluidized bed polymerization reactor.

The monomers can be introduced into the polymerization zone in various ways including, but not limited to, direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. A gas analyzer determines the composition of the recycle stream, and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of inventive polyethylene composition may be conveniently controlled by adjusting the rate of catalyst composition injection, monomer concentration, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor, i.e. the difference between inlet fluid temperature and exit fluid temperature, is indicative of the rate of inventive polyethylene composition formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are, for example, disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas phase reactor embodiment, the reactor temperature of the fluidized bed process herein ranges from 70° C. or 75° C., or 80° C. to 90° C. or 95° C. or 100° C. or 110° C. or 115° C., wherein a desirable temperature range comprises any upper temperature limit combined with any lower temperature limit described herein. In general, the reactor temperature is operated at the highest temperature that is feasible, taking into account the sintering temperature of the inventive polyethylene composition within the reactor and fouling that may occur in the reactor or recycle line(s) as well as the impact on the inventive polyethylene composition and catalyst productivity.

The process of the present invention is suitable for the production of homopolymers comprising ethylene derived units, or copolymers comprising ethylene derived units and at least one or more other α-olefin(s) derived units.

In order to maintain an adequate catalyst productivity in the present invention, it is preferable that the ethylene is present in the reactor at a partial pressure at or greater than 160 psia (1100 kPa), or 190 psia (1300 kPa), or 200 psia (1380 kPa), or 210 psia (1450 kPa), or 220 psia (1515 kPa), or 230 psia (1585 kPa), or 240 psia (1655 pKa).

The comonomer, e.g. one or more α-olefin comonomers, if present in the polymerization reactor, is present at any level that will achieve the desired weight percent incorporation of the comonomer into the finished polyethylene. This may be expressed as a mole ratio of comonomer to ethylene as described herein, which is the ratio of the gas concentration of comonomer moles in the cycle gas to the gas concentration of ethylene moles in the cycle gas. In one embodiment of the inventive polyethylene composition production, the comonomer is present with ethylene in the cycle gas in a mole ratio range of from 0 to 0.1 (comonomer: ethylene); and from 0 to 0.05 in another embodiment; and from 0 to 0.04 in another embodiment; and from 0 to 0.03 in another embodiment; and from 0 to 0.02 in another embodiment.

Hydrogen gas may also be added to the polymerization reactor(s) to control the final properties (e.g., $I_{21}$ and/or $I_2$) of the inventive polyethylene composition. In one embodiment, the ratio of hydrogen to total ethylene monomer (ppm $H_2$/mol % $C_2$) in the circulating gas stream is in a range of from 0 to 60:1; in another embodiment, from 0.10:1 (0.10) to 50:1 (50); in another embodiment, from 0 to 35:1 (35); in another embodiment, from 0 to 25:1 (25); in another embodiment, from 7:1 (7) to 22:1 (22).

The hafnium based catalyst system, as used herein, refers to a catalyst composition capable of catalyzing the polymerization of ethylene monomers and optionally one or more α-olefin co monomers to produce polyethylene. Furthermore, the hafnium based catalyst system comprises a hafnocene component. The hafnocene component may have an average particle size in the range of 12 to 35 μm; for example, the hafnocene component may have an average particle size in the range of 20 to 30 μm, e.g. 25μ. The hafnocene component may comprise mono-, bis- or tris-cyclopentadienyl-type complexes of hafnium. In one embodiment, the cyclopentadienyl-type ligand comprises cyclopentadienyl or ligands isolobal to cyclopentadienyl and substituted versions thereof. Representative examples of ligands isolobal to cyclopentadienyl include, but are not limited to, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H₄Ind") and substituted versions thereof. In one embodiment, the hafnocene component is an unbridged bis-cyclopentadienyl hafnocene and substituted versions thereof. In another embodiment, the hafnocene component excludes unsubstituted bridged and unbridged bis-cyclopentadienyl hafnocenes, and unsubstituted bridged and unbridged bis-indenyl hafnocenes. The term "unsubstituted," as used herein, means that there are only hydride groups bound to the rings and no other group. Preferably, the hafnocene useful in the present invention can be represented by the formula (where "Hf" is hafnium):

$$Cp_nHfX_p \qquad (1)$$

wherein $n$ is 1 or 2, $p$ is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when $n$ is 2, each Cp may be bound to one another through a bridging group A selected from the group consisting of $C_1$ to $C_5$ alkylenes, oxygen, alkylamine, silyl-hydrocarbons, and siloxyl-hydrocarbons. An example of $C_1$ to $C_5$ alkylenes include ethylene (—$CH_2CH_2$—) bridge groups; an example of an alkylamine bridging group includes methylamide (—($CH_3$)N—); an example of a silyl-hydrocarbon bridging group includes dimethylsilyl (—($CH_3$)$_2$Si—); and an example of a siloxyl-hydrocarbon bridging group includes (—O—($CH_3$)$_2$Si—O—). In one particular embodiment, the hafnocene component is represented by formula (1), wherein $n$ is 2 and $p$ is 1 or 2.

As used herein, the term "substituted" means that the referenced group possesses at least one moiety in place of one or more hydrogens in any position, the moieties selected from such groups as halogen radicals such as F, Cl, Br, hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof. More preferably, the hafnocene component useful in the present invention can be represented by the formula:

$$(CpR_5)_2HfX_2 \quad (2)$$

wherein each Cp is a cyclopentadienyl ligand and each is bound to the hafnium; each R is independently selected from hydrides and $C_1$ to $C_{10}$ alkyls, most preferably hydrides and $C_1$ to $C_5$ alkyls; and X is selected from the group consisting of hydride, halide, $C_1$ to $C_{10}$ alkyls and $C_2$ to $C_{12}$ alkenyls, and more preferably X is selected from the group consisting of halides, $C_2$ to $C_6$ alkylenes and $C_1$ to $C_6$ alkyls, and most preferably X is selected from the group consisting of chloride, fluoride, $C_1$ to $C_5$ alkyls and $C_2$ to $C_6$ alkylenes. In a most preferred embodiment, the hafnocene is represented by formula (2) above, wherein at least one R group is an alkyl as defined above, preferably a $C_1$ to $C_5$ alkyl, and the others are hydrides. In a most preferred embodiment, each Cp is independently substituted with from one, two, or three groups selected from the group consisting of methyl, ethyl, propyl, butyl, and isomers thereof.

In one embodiment, the hafnocene based catalyst system is heterogeneous, i.e. the hafnocene based catalyst may further comprise a support material. The support material can be any material known in the art for supporting catalyst compositions; for example, an inorganic oxide; or in the alternative, silica, alumina, silica-alumina, magnesium chloride, graphite, magnesia, titania, zirconia, and montmorillonite, any of which can be chemically/physically modified such as by fluoriding processes, calcining or other processes known in the art. In one embodiment the support material is a silica material having an average particle size as determined by Malvern analysis of from 1 to 60 mm; or in the alternative, 10 to 40 mm.

In one embodiment, the hafnocene component may be spray-dried hafnocene composition containing a micro-particulate filler such as Cabot TS-610.

The hafnocene based catalyst system may further comprise an activator. Any suitable activator known to activate catalyst components for olefin polymerization may be suitable. In one embodiment, the activator is an alumoxane; in the alternative methalumoxane such as described by J. B. P. Soares and A. E. Hamielec in 3(2) POLYMER REACTION ENGINEERING, 131-200 (1995). The alumoxane may preferably be co-supported on the support material in a molar ratio of aluminum to hafnium (Al:Hf) ranging from 80:1 to 200:1, most preferably 90:1 to 140:1.

Such hafnium based catalyst systems are further described in details in the U.S. Pat. Nos. 6,242,545 and 7,078,467, incorporated herein by reference.

The fibers according to the instant invention comprise the inventive polyethylene composition, and optionally one or more other polymers. The inventive fibers may have a denier per filament in the range of less than 50 g/9000 m. All individual values and subranges from less than 50 g/9000 m are included herein and disclosed herein; for example, the denier per filament can be from a lower limit of 0.1, 0.5, 1, 5, 10, 15, 17, 20, 25, 30, 33, 40, or 44 g/9000 m to an upper limit of 0.5, 1, 5, 10, 15, 17, 20, 25, 30, 33, 40, 44, or 50 g/9000 m. For example, the inventive fibers may have a denier per filament in the range of less than 40 g/9000 m; or in the alternative, the inventive fibers may have a denier per filament in the range of less than 30 g/9000 m; or in the alternative, the inventive fibers may have a denier per filament in the range of less than 20 g/9000 m; or in the alternative, the inventive fibers may have a denier per filament in the range of less than 10 g/9000 m; or in the alternative, the inventive fibers may have a denier per filament in the range of less than 5 g/9000 m; or in the alternative, the inventive fibers may have a denier per filament in the range of less than 3 g/9000 m; or in the alternative, the inventive fibers may have a denier per filament in the range of less than 2 g/9000 m; or in the alternative, the inventive fibers may have a denier per filament in the range of less than 1.5 g/9000 m.

The inventive fibers may have a tenacity in the range of 0.1 to 15 g/denier. All individual values and subranges from 0.1 to 15 g/denier are included herein and disclosed herein; for example, the tenacity can be from a lower limit of 0.1, 0.5, 1, 2, 3, 4, 5, 7, 9, or 10 g/denier to an upper limit of 0.5, 1, 2, 3, 4, 5, 7, 9, 10, 12, or 15 g/denier. For example, the inventive fibers may have a tenacity in the range of 0.1 to 10 g/denier; or in the alternative, the inventive fibers may have a tenacity in the range of 0.1 to 7 g/denier; or in the alternative, the inventive fibers may have a tenacity in the range of 0.1 to 5 g/denier; or in the alternative, the inventive fibers may have a tenacity in the range of 0.1 to 4 g/denier; or in the alternative, the inventive fibers may have a tenacity in the range of 0.1 to 3 g/denier; or in the alternative, the inventive fibers may have a tenacity in the range of 0.1 to 2 g/denier; or in the alternative, the inventive fibers may have a tenacity in the range of 0.1 to 1.5 g/denier; or in the alternative, the inventive fibers may have a tenacity in the range of 0.1 to 1.0 g/denier; or in the alternative, the inventive fibers may have a tenacity in the range of 1.5 to 5 g/denier; or in the alternative, the inventive fibers may have a tenacity in the range of 2 to 5 g/denier; or in the alternative, the inventive fibers may have a tenacity in the range of 2 to 4 g/denier; or in the alternative, the inventive fibers may have a tenacity in the range of 2.5 to 3.5 g/denier.

The inventive fibers may have an elongation measured in percent of less than 1500. All individual values and subranges from less than 1500 percent are included herein and disclosed herein; for example, the elongation measured in percent can be from a lower limit of 1, 5, 10, 15, 20, 25, 30, 50, 75, 100, 150, 200, 500, or 900 percent to an upper limit of 5, 10, 15, 20, 25, 30, 50, 75, 100, 150, 200, 300, 500, 900, 1000, or 1400 percent. For example, the inventive fibers may have an elongation measured in percent of less than 1400; or in the alternative, the inventive fibers may have an elongation measured in percent of less than 1000; or in the alternative, the inventive fibers may have an elongation measured in percent of less than 500; or in the alternative, the inventive fibers may have an elongation measured in percent of less than 300; or in the alternative, the inventive fibers may have an elongation measured in percent of less than 200; or in the alternative, the inventive fibers may have an elongation measured in percent of less than 150; or in the alternative, the inventive fibers may have an elongation measured in percent of less than 125; or in the alternative, the inventive fibers may have an elongation measured in percent of less than 110; or in the alternative, the inventive fibers may have an elongation measured in percent of less than 100; or in the alternative, the inventive fibers may have an elongation measured in percent of less than 90; or in the alternative, the inventive fibers may have an elongation measured in percent of less than 80; or in the alternative, the inventive fibers may have an elongation measured in percent of less than 70; or in the alternative, the inventive fibers may have an elongation measured in percent of less than 50; or in the alternative, the inventive fibers may have an elongation measured in percent of less than 25; or in the alternative, the inventive fibers may have an elongation measured in percent of less than 15.

The inventive fibers may have a boiling water shrink measured in percent after being annealed at 120° C. in the range of less than 50. All individual values and subranges from less than 50 percent are included herein and disclosed herein; for example, the boiling water shrink measured in percent can be from a lower limit of 0.1, 0.5, 1, 2, 5, 10, 15, 20, 25, 30, or 40 percent to an upper limit of 0.5, 1, 2, 5, 10, 15, 20, 25, 30, 40, or 45 percent. For example, the inventive fibers may have a boiling water shrink measured in percent after being annealed at 120° C. in the range of less than 40; or in the alternative, the inventive fibers may have a boiling water shrink measured in percent after being annealed at 120° C. in the range of less than 30; or in the alternative, the inventive fibers may have a boiling water shrink measured in percent after being annealed at 120° C. in the range of less than 35; or in the alternative, the inventive fibers may have a boiling water shrink measured in percent after being annealed at 120° C. in the range of less than 25; or in the alternative, the inventive fibers may have a boiling water shrink measured in percent after being annealed at 120° C. in the range of less than 20; or in the alternative, the inventive fibers may have a boiling water shrink measured in percent after being annealed at 120° C. in the range of less than 15; or in the alternative, the inventive fibers may have a boiling water shrink measured in percent after being annealed at 120° C. in the range of less than 10; or in the alternative, the inventive fibers may have a boiling water shrink measured in percent after being annealed at 120° C. in the range of less than 5; or in the alternative, the inventive fibers may have a boiling water shrink measured in percent after being annealed at 120° C. in the range of less than 4; or in the alternative, the inventive fibers may have a boiling water shrink measured in percent after being annealed at 120° C. in the range of less than 2; or in the alternative, the inventive fibers may have a boiling water shrink measured in percent after being annealed at 120° C. in the range of less than 1. In one embodiment, the inventive fibers are drawn and annealed at a constant length at equal to or less than 120° C.

Inventive fibers according to the instant invention may be produced via different techniques. The inventive fibers may, for example, be produced via melt spinning. The inventive fibers according to instant invention may be continuous filaments, or in the alternative, the inventive fibers may be staple fibers. Continuous filaments may further be optionally crimped, and then cut to produce staple fibers. The inventive fibers include, but are not limited to, mono-component fibers, bi-component fibers, and/or multi-component fibers. Exemplary bi-component fibers include, but are not limited to, sheath/core, islands in the sea, segmented pie, and combination thereof. The inventive fibers may include the inventive polyethylene composition according to the instant invention as an outer layer, e.g. sheath, alone or in combination with one or more polymers. The inventive fibers may include the inventive polyethylene composition according to the instant invention as an inner layer, e.g. core, alone or in combination with one or more polymers. The inventive fibers or the inventive fiber components, i.e. inner layer and outer layer, according to the instant invention may be mono-constituent, i.e. only inventive polyethylene composition; or in the alternative, the inventive fibers or the inventive fiber components, i.e. inner layer and outer layer according to the instant invention may be multi-constituent, i.e. a blend of inventive polyethylene composition and one or more polymers. The term outer layer, as used herein, refers to at least any portion of the fiber surface. The term inner layer, as used herein, refers to any portion below the fiber surface.

In melt spinning, the inventive polyethylene composition is melt extruded and forced through the fine orifices in a metallic plate called spinneret into air or other gas, where it is cooled and solidified. The solidified filaments may be drawn-off via rotating rolls, or godets, and wound onto bobbins.

Inventive fabrics according to instant invention include, but are not limited to, non-woven fabrics, woven fabrics, and combination thereof.

The non-woven fabrics according to the instant invention may be fabricated via different techniques. Such methods include, but are not limited to, melt blown process, spunbond process, carded web process, air laid process, thermo-calendering process, adhesive bonding process, hot air bonding process, needle punch process, hydroentangling process, electrospinning process, and combinations thereof.

In melt blown process, the inventive non-woven fabric is formed by extruding molten polyethylene composition of the instant invention through a die, then, attenuating and/or optionally breaking the resulting filaments with hot, high-velocity air or stream thereby forming short or long fiber lengths collected on a moving screen where they bond during cooling.

In the alternative, the melt blown process generally includes the following steps: (a) Extruding strands from a spinneret; (b) Simultaneously quenching and attenuating the polymer stream immediately below the spinneret using streams of high velocity heated air; (c) Collecting the drawn strands into a web on a foraminous surface. Meltblown webs can be bonded by a variety of means including, but not limited to, autogeneous bonding, i.e. self bonding without further treatment, thermo-calendering process, adhesive bonding process, hot air bonding process, needle punch process, hydroentangling process, and combinations thereof.

In spunbond process, the fabrication of non-woven fabric includes the following steps: (a) extruding strands of the inventive polyethylene composition from a spinneret; (b) quenching the strands of the inventive polyethylene composition with a flow of air which is generally cooled in order to hasten the solidification of the molten strands of the inventive polyethylene composition; (c) attenuating the filaments by advancing them through the quench zone with a draw tension that can be applied by either pneumatically entraining the filaments in an air stream or by wrapping them around mechanical draw rolls of the type commonly used in the textile fibers industry; (d) collecting the drawn strands into a web on a foraminous surface, e.g. moving screen or porous belt; and (e) bonding the web of loose strands into the non-woven fabric. Bonding can be achieved by a variety of means including, but not limited to, thermo-calendering process, adhesive bonding process, hot air bonding process, needle punch process, hydroentangling process, and combinations thereof.

The inventive woven fabrics according to the instant invention may be fabricated from the inventive fibers via different techniques. Such methods include, but are not limited to, weaving process, and knitting process.

In the weaving process, two sets of yarns, i.e. warp and weft, are interlaced to form the inventive woven fabric. The manner in which the two sets of yarns are interlaced determines the weave. The weaving process may be achieved via different equipments including, but not limited to, Dobby loom, Jacquard loom, and Power loom. By using various combinations of the three basic weaves, i.e. plain, twill, and satin, it is possible to produce an almost unlimited variety of constructions.

In the knitting process, the inventive woven fabric is formed by interlocking a series of loops of one or more yarns. The two major classes of knitting include, but are not limited to, wrap knitting and weft knitting.

Warp Knitting is a type of knitting in which the yarns generally run lengthwise in the fabric. The yarns are prepared as warps on beams with one or more yarns for each needle. Weft Knitting is, however, a common type of knitting, in which one continuous thread runs crosswise in the fabric making all of the loops in one course. Weft knitting types are circular and flat knitting.

The inventive fabrics according to the instant invention possess improved softness and drapeability properties. The inventive fabrics according to the instant invention further provide higher tenacity fabrics. The inventive polyethylene composition further provides improved processability and spinnability at lower melt indices, for example, in the range of less than 10 g/10 minutes, or in the alternative, in the range of less than 5 g/10 minutes. The low levels of vinyl unsaturations in the inventive polyethylene composition are also important because such low levels of the vinyl unsaturations provide the instant inventive polyethylene composition with improved processability.

The inventive fabrics according to the instant invention may have an abrasion resistance in the range of less than or equal to 5 percent by weight of abraded fibers per weight of the fabric prior to abrasion testing. All individual values and subranges from less than or equal to 5 weight percent are included herein and disclosed herein; for example, abrasion resistance can be from a lower limit of 0.1, 0.5, 1, 2, 3, or 3.5 weight percent to an upper limit of 0.5, 1, 2, 3, 3.5, 4, or 5 weight percent. For example, the inventive fabrics may have an abrasion resistance in the range of less than or equal to 4 percent by weight of abraded fibers per weight of the fabric prior to abrasion testing; or in the alternative, the inventive fabrics may have an abrasion resistance in the range of less than or equal to 3.5 percent by weight of abraded fibers per weight of the fabric prior to abrasion testing; or in the alternative, the inventive fabrics may have an abrasion resistance in the range of less than or equal to 3 percent by weight of abraded fibers per weight of the fabric prior to abrasion testing; or in the alternative, the inventive fabrics may have an abrasion resistance in the range of less than or equal to 2.5 percent by weight of abraded fibers per weight of the fabric prior to abrasion testing; or in the alternative, the inventive fabrics may have an abrasion resistance in the range of less than or equal to 2 percent by weight of abraded fibers per weight of the fabric prior to abrasion testing.

The inventive fabrics comprising one or more fibers having a denier per filament in the range of less than 5 g/9000 m, e.g. 2 g/9000 m, may have a smoothness value in the range of less than 2. All individual values and subranges from less than 2 are included herein and disclosed herein; for example, the inventive fabrics comprising one or more fibers having a denier per filament in the range of less than 5 g/9000 m, e.g. 2 g/9000 m, may have a smoothness value in the range of less than 1.8; or in the alternative, the inventive fabrics comprising one or more fibers having a denier per filament in the range of less than 5 g/9000 m, e.g. 2 g/9000 m, may have a smoothness value in the range of less than 1.7; or in the alternative, the inventive fabrics comprising one or more fibers having a denier per filament in the range of less than 5 g/9000 m, e.g. 2 g/9000 m, may have a smoothness value in the range of less than 1.5; or in the alternative, the inventive fabrics comprising one or more fibers having a denier per filament in the range of less than 5 g/9000 m, e.g. 2 g/9000 m, may have a smoothness value in the range of less than 1.3.

The inventive fabrics comprising one or more fibers having a denier per filament in the range of less than 5 g/9000 m, e.g. 2 g/9000 m, may have a wax value in the range of greater than 7. All individual values and subranges from greater than 7 are included herein and disclosed herein; for example, the inventive fabrics comprising one or more fibers having a denier per filament in the range of less than 5 g/9000 m, e.g. 2 g/9000 m, may have a wax value in the range of greater than 7.5.

The inventive fabrics comprising one or more fibers having a denier per filament in the range of less than 5 g/9000 m, e.g. 2 g/9000 m, may have a hand friction value in the range of less than 3.5. All individual values and subranges from less than 3.5 are included herein and disclosed herein; for example, the inventive fabrics comprising one or more fibers having a denier per filament in the range of less than 5 g/9000 m, e.g. 2 g/9000 m, may have a hand friction value in the range of less than 3.3; or in the alternative, the inventive fabrics comprising one or more fibers having a denier per filament in the range of less than 5 g/9000 m, e.g. 2 g/9000 m, may have a hand friction value in the range of less than 3.0; or in the alternative, the inventive fabrics comprising one or more fibers having a denier per filament in the range of less than 5 g/9000 m, e.g. 2 g/9000 m, may have a hand friction value in the range of less than 2.5; or in the alternative, the inventive fabrics comprising one or more fibers having a denier per filament in the range of less than 5 g/9000 m, e.g. 2 g/9000 m, may have a hand friction value in the range of less than 2.0.

The inventive fabrics comprising one or more fibers having a denier per filament in the range of less than 5 g/9000 m, e.g. 2 g/9000 m, may have a stiffness value in the range of less than 1.1. All individual values and subranges from less than 1.1 are included herein and disclosed herein; for example, the inventive fabrics comprising one or more fibers having a denier per filament in the range of less than 5 g/9000 m, e.g. 2 g/9000 m, may have a stiffness value in the range of less than 1.0; or in the alternative, the inventive fabrics comprising one or more fibers having a denier per filament in the range of less than 5 g/9000 m, e.g. 2 g/9000 m, may have a stiffness value in the range of less than 0.8; or in the alternative, the inventive fabrics comprising one or more fibers having a denier per filament in the range of less than 5 g/9000 m, e.g. 2 g/9000 m, may have a stiffness value in the range of less than 0.7.

The inventive fabrics comprising one or more fibers having a denier per filament in the range of less than 5 g/9000 m, e.g. 2 g/9000 m, may have a smoothness value in the range of less than 2, a wax value in the range of greater than 7, a hand friction value in the range of less than 3.5, and a stiffness value in the range of less than 1.1.

The inventive fabrics comprising one or more fibers having a denier per filament in the range of 5 to 7 g/9000 m, e.g. 6 g/9000 m, may have a smoothness value in the range of less than 8. All individual values and subranges from less than 8 are included herein and disclosed herein; for example, the inventive fabrics comprising one or more fibers having a denier per filament in the range of 5 to 7 g/9000 m, e.g. 6 g/9000 m, may have a smoothness value in the range of less than 7; or in the alternative, the inventive fabrics comprising one or more fibers having a denier per filament in the range of 5 to 7 g/9000 m, e.g. 6 g/9000 m, may have a smoothness value in the range of less than 6.

The inventive fabrics comprising one or more fibers having a denier per filament in the range of 5 to 7 g/9000 m, e.g. 6 g/9000 m, may have a wax value in the range of greater than 8. All individual values and subranges from greater than 8 are included herein and disclosed herein; for example, the inventive fabrics comprising one or more fibers having a denier per filament in the range of 5 to 7 g/9000 m, e.g. 6 g/9000 m, may have a wax value in the range of greater than 8.5.

The inventive fabrics comprising one or more fibers having a denier per filament in the range of 5 to 7 g/9000 m, e.g. 6 g/9000 m, may have a hand friction value in the range of less than 7.0. All individual values and subranges from less than 7.0 are included herein and disclosed herein; for example, the inventive fabrics comprising one or more fibers having a denier per filament in the range of 5 to 7 g/9000 m, e.g. 6 g/9000 m, may have a hand friction value in the range of less than 6.0.

The inventive fabrics comprising one or more fibers having a denier per filament in the range of 5 to 7 g/9000 m, e.g. 6 g/9000 m, may have a stiffness value in the range of less than 3.0. All individual values and subranges from less than 3.0 are included herein and disclosed herein; for example, the inventive fabrics comprising one or more fibers having a denier per filament in the range of 5 to 7 g/9000 m, e.g. 6 g/9000 m, may have a stiffness value in the range of less than 2.0; or in the alternative, the inventive fabrics comprising one or more fibers having a denier per filament in the range of 5 to 7 g/9000 m, e.g. 6 g/9000 m, may have a stiffness value in the range of less than 1.8.

The inventive fabrics comprising one or more fibers having a denier per filament in the range of 5 to 7 g/9000 m, e.g. 6 g/9000 m, may have a smoothness value in the range of less than 8, a wax value in the range of greater than 8, a hand friction value in the range of less than 7, and a stiffness value in the range of less than 3.

The inventive fabrics possess improved resistance to dryer. Additionally, the inventive fabrics are substantially waterproof.

The inventive polyethylene composition may be used in a variety of end-use applications including, but not limited to, carpet, apparel, upholstery, non-woven fabrics, woven fabrics, artificial turf, medical gowns, hospital wraps, and the like.

EXAMPLES

The following examples illustrate the present invention but are not intended to limit the scope of the invention. The examples of the instant invention demonstrate that the inventive fabrics according to the instant invention possess improved softness and drapeability properties, and higher tenacity. These examples further demonstrate that the inventive polyethylene composition provides improved processability and spinnability at lower melt indices, for example, in the range of less than 10 g/10 minutes, or in the alternative, in the range of less than 5 g/10 minutes.

Inventive Polyethylene Samples 1-3

Catalyst Component Preparation The hafnocene component can be prepared by techniques known in the art. For example, $HfCl_4$ (1.00 equiv.) can be added to ether at −30 to −50° C. and stirred to give a white suspension. The suspension can then be re-cooled to −30 to −50° C., and then lithium propylcyclopentadienide (2.00 equiv.) added in portions. The reaction will turn light brown and become thick with suspended solid on adding the lithium propylcyclopentadienide. The reaction can then be allowed to warm slowly to room temperature and stirred for 10 to 20 hours. The resultant brown mixture can then be filtered to give brown solid and a straw yellow solution. The solid can then be washed with ether as is known in the art, and the combined ether solutions concentrated to under vacuum to give a cold, white suspension. Off-white solid product is then isolated by filtration and dried under vacuum, with yields of from 70 to 95 percent.

Catalyst Composition Preparation

The catalyst compositions should be made at a Al/Hf mole ratio of from about 80:1 to 130:1 and the hafnium loading on the finished catalyst should be from about 0.6 to 0.8 weight percent Hf using the following general procedure. Methylaluminoxane (MAO) in toluene should be added to a clean, dry vessel and stirred at from 50 to 80 rpm and at a temperature in the range of 60 to 100° F. Additional toluene can then be added while stirring. The hafnocene can then be dissolved in toluene and placed in the vessel with the MAO. The metallocene/MAO mixture can then be stirred at for from 30 min to 2 hours. Next, an appropriate amount of silica (average particle size in the range of 22 to 28 µm, dehydrated at 600° C.) can be added and stirred for another hour or more. The liquid can then be decanted and the catalyst composition dried at elevated temperature under flowing nitrogen while being stirred.

Polymerization Process

The ethylene/1-hexene copolymers were produced in accordance with the following general procedure. The catalyst composition comprised a silica supported bis(n-propylcyclopentadienyl) hafnium dichloride with methalumoxane, the Al:Hf ratio being from about 80:1 to 130:1. The catalyst composition was injected dry into a fluidized bed gas phase polymerization reactor. More particularly, polymerization was conducted in a 336.5-419.3 mm ID diameter gas-phase fluidized bed reactor operating at approximately 2068 to 2586 kPa total pressure. The reactor bed weight was approximately 41-91 kg. Fluidizing gas was passed through the bed at a velocity of approximately 0.49 to 0.762 m per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Gas concentrations were measured by an on-line vapor fraction analyzer. Product (the inventive polyethylene particles) was withdrawn from the reactor in batch mode into a purging vessel before it was transferred into a product bin. Residual catalyst and activator in the resin was deactivated in the product drum with a wet nitrogen purge. The catalyst was fed to the reactor bed through a stainless steel injection tube at a rate sufficient to maintain the desired polymer production rate. There were 3 separate polymerization runs conducted using this general process, each with varying conditions as elucidated in the Table I. Table II summarizes the properties of the inventive polyethylene samples 1-3 that resulted from each run.

Inventive Fibers 1-3

Inventive polyethylene samples 1-3 were formed into inventive fibers 1-3, respectively, according to the process described below, and tested for their physical properties. The results are shown in Table III.

Inventive fibers 1-3 were spun at a 230° C. melt temperature through a 48-hole spinneret (0.5 mm×4 L/D capillaries). The speed of the winder was at 1500 m/min, and the godet speeds were varied up and down to vary the draw ratio. Relaxation between Godet C and the Winder was less than 5%. The draw ration between Godet A and Godet B was 3.25, 4.8, and 2.2 for inventive fiber 1, 2, and 3, respectively. Quench air was at 12° C. and it was fed from one side only; quench cabinet length was two meters. The three godets were set at 60° C., 100° C., and 110° C., respectively. Packages of yarn were collected for mechanical testing, which was conducted according to the following procedure. Inventive fibers 1-3 were set in conventional fiber horn jaws at an initial length of 8 inches. Top jaw speed was set to 8 inches/minute. Five replicates were run. Maximum force and elongation at maximum forces were recorded and averaged, and the results are shown in Table III.

The inventive fiber 1-3 were tested for their boiling water shrinkage according to the following procedure. Inventive fiber 1-3 were cut from the yarn package, marked for length, submerged for 15 seconds in hot water, then withdrawn and remeasured. The boiling water shrinkage results for the unannealed inventive fibers 1-3 are shown in Table IV. The inventive fibers 1-3 were heat-set at constant length in a hot air oven for 7 minutes at 120° C. prior to retesting in boiling water. The boiling water shrinkage results for the annealed inventive fibers 1-3 are also shown in Table IV.

Inventive Fibers 4 and 5

Inventive polyethylene sample 2 was formed into inventive fibers 4 and 5 according to the process described below, and tested for its physical properties. The results are shown in Table III.

Inventive fibers 4 and 5 were spun at a 230° C. melt temperature through a 48-hole spinneret (0.5 mm×4 L/D capillaries) and 144-hole spinneret, respectively. The speed of the winder was at 1500 m/min, and the godet speeds were varied up and down to vary the draw ratio. Relaxation between Godet C and the Winder was less than 5%. The draw ration between Godet A and Godet B was 3.8 and 2 for inventive fibers 4 and 5 respectively. Quench air was at 12° C. and it was fed from one side only; quench cabinet length was two meters. The three godets were set at 60° C., 100° C., and 110° C., respectively.

Inventive Knitted Fabrics A and B

Inventive fibers 4 and 5 were knitted to form inventive knitted fabrics A and B under the following Knitting Conditions. The inventive fibers 4 and 5 were knitted on an FAK (Fabric Analysis Knitter) knitter typically used to check quality on lots of yarn lots. The inventive knitted fabrics A and B were approximately 500 g/m² basis weight in a "plain jersey knit." The inventive knitted fabrics A and B were each a fabric with 28 rows (or "courses") per inch.

Inventive knitted fabrics A and B were tested for their perception of softness based on the smoothness, waxy, stiffness, and hand friction according to the Handfeel Test, as described hereinbelow. The results, i.e. the average ratings, are shown in Tables V-IX.

Inventive knitted fabrics A and B were also tested for abrasion resistance according to the following procedure. The abrasion resistance was determined using a Sutherland 2000 Rub Tester. Samples at a dimension of 11.0 cm×4.0 cm (4.33"×1.57") were cut and mounted to the base using double stick tape. 320-Grit sandpaper was then mounted to a 2-lb weight, and the weight placed on the sample. An arm then moved the weight back and forth in a continuous motion at Speed 2. One cycle is one movement back and forth of the weight against the fabric. Sixty cycles were required before the samples displayed any visible fuzzing. When adhesive tape was applied to the surface of the inventive knitted fabrics A and B, and comparative knitted fabrics A-C, and then ripped off, very few fibers were collected on the tape from either the inventive knitted fabrics A or B or comparative knitted fabrics A-C; thus, it was indicating that the inventive knitted fabrics A and B have maintained their integrity at least at the same level as the comparative knitted fabrics A-C. The samples were tested twice, and their average results are shown in Table X.

Comparative Polymer Compositions 1-3

Comparative polymer composition 1 is a polypropylene homopolymer having a melt flow rate of 9.5 (230° C. and 2.16 kg load), which is commercially available from The Dow Chemical Company. The properties of comparative polymer composition 1 are shown in Table IIA.

Comparative polymer composition 2 is a polypropylene homopolymer having a melt flow rate of 38 (230° C. and 2.16 kg load), which is commercially available from The Dow Chemical Company. The properties of comparative polymer composition 2 are shown in Table IIA.

Comparative polymer composition 3 is a linear low density polyethylene (ethylene/octene copolymer) having a density of approximately 0.941 g/cm³, and a melt index ($I_2$) of approximately 4, which is commercially available from The Dow Chemical Company. The properties of comparative polymer composition 3 are shown in Table IIA.

Comparative Fibers 1-2

Comparative polymer composition 1 and 2 were formed into comparative fibers 1 and 2, respectively, according to the process described below, and tested for their physical properties. The results are shown in Table IIIA.

Comparative fibers 1-2 were spun at a 230° C. melt temperature through a 48-hole spinneret (0.5 mm×4 L/D capillaries). The speed of the winder was at 1500 m/min, and the godet speeds were varied up and down to vary the draw ratio. Relaxation between Godet C and the Winder was less than 5%. The draw ration between Godet A and Godet B ($V_2$:$V_1$) was 2.75, and 3.6 for comparative fibers 1, and 2, respectively. Quench air was at 12° C. and it was fed from one side only; quench cabinet length was two meters. The three godets were set at 60° C., 100° C., and 110° C., respectively. Packages of yarn were collected for mechanical testing, which was conducted according to the following procedure. Comparative fibers 1-2 were set in conventional fiber horn jaws at an initial length of 8 inches. Top jaw speed was set to 8 inches/minute. Five replicates were run. Maximum force and elongation at maximum forces were recorded and averaged, and the results are shown in Table IIIA.

The comparative fiber 2 was tested for its boiling water shrinkage according to the following procedure. Comparative fiber 2 was cut from the yarn package, marked for length, submerged for 15 seconds in hot water, then withdrawn and remeasured. The boiling water shrinkage results for the unannealed comparative fiber 2 are shown in Table IV. The comparative fiber 2 was heat-set at constant length in a hot air oven for 7 minutes at 120° C. prior to retesting in boiling water. The boiling water shrinkage results for the annealed comparative fiber 2 are also shown in Table IV.

Comparative Fibers 1A-3A

Comparative polymer composition 1-3 were also formed into comparative fibers 1A-3A, respectively.

Comparative fibers 1A-3A were spun at a 230° C. melt temperature through a 48-hole spinneret (0.5 mm×4 L/D capillaries). The speed of the winder was at 1500 m/min, and the godet speeds were varied up and down to vary the draw ratio. Relaxation between Godet C and the Winder was less than 5%. The draw ration between Godet A and Godet B ($V_2:V_1$) was 2.8, 2, and 2.2 for comparative fibers 1A, 2A, and 3A, respectively. Quench air was at 12° C., and it was fed from one side only; quench cabinet length was two meters. The three godets were set at 60° C., 100° C., and 110° C., respectively. Fiber properties and maximum draw ratios are shown in Table IIIA.

Comparative Knitted Fabrics A-C

Comparative fibers 1A-3A were knitted to form comparative knitted fabrics A-C under the following Knitting Conditions. The comparative fibers 1A-3A were knitted on an FAK (Fabric Analysis Knitter) knitter typically used to check quality on lots of yarn lots. The comparative knitted fabrics A-C were approximately 500 g/m² basis weight in a "plain jersey knit." Each comparative knitted fabric A-C was a fabric with 28 rows (or "courses") per inch.

Comparative knitted fabrics A-C were tested for their perception of softness based on the smoothness, waxy, stiffness, and hand friction according to the Handfeel Test, as described hereinbelow. The results, i.e. the average ratings, are shown in Tables V-IX.

Comparative knitted fabrics A-C were tested for abrasion resistance according to the following procedure. The abrasion resistance was determined using a Sutherland 2000 Rub Tester. Samples at a dimension of 11.0 cm×4.0 cm (4.33"×1.57") were cut and mounted to the base using double stick tape. 320-Grit sandpaper was then mounted to a 2-lb weight, and the weight placed on the sample. An arm then moved the weight back and forth in a continuous motion at Speed 2. One cycle is one movement back and forth of the weight against the fabric. Sixty cycles were required before the samples displayed any visible fuzzing. When adhesive tape was applied to the surface of the inventive knitted fabrics A and B, and comparative knitted fabrics A-C, and then ripped off, very few fibers were collected on the tape from either the inventive knitted fabrics A or B or comparative knitted fabrics A-C. The samples were tested twice, and their average results are shown in Table X.

TABLE I

| Measurement | Units | Inventive 2 | Inventive 3 |
|---|---|---|---|
| Reactor Temperature | ° C. | 95.0 | 85.0 |
| Isopentane % | mole percent | 4.8 | 5.1 |
| Ethylene Partial Pressure | psia | 225.0 | 225.0 |
| C6/C2 molar ratio | unitless | 0.0016 | 0.0015 |
| Hydrogen Vapor Concentration | ppm | 320 | 345 |
| Continuity Additive amount in resin | ppm(w) | 6 | 6 |
| Hf amount in resin | ppm(w) | 0.87 | 0.82 |
| Al amount in resin | ppm(w) | 11.3 | 13.2 |

TABLE II

| Measurement | Units | Inventive PE 1 | Inventive PE 2 | Inventive PE 3 |
|---|---|---|---|---|
| Density | g/cm³ | 0.9417 | 0.954 | 0.9557 |
| $I_2$ | g/10 min | 5.89 | 10.4 | 18.9 |
| $I_5$ | g/10 min | 14.78 | 27.2 | 47.27 |
| $I_{10}$ | g/10 min | 34.97 | 65.8 | 116.2 |
| $I_{21}$ | g/10 min | 101.5 | 201.3 | 371.1 |
| $I_{10}/I_2$ | — | 5.93 | 6.3 | 6.1 |
| $I_{21}/I_2$ | — | 17.2 | 19.3 | 19.6 |
| Conventional GPC | | | | |
| Mn | g/mol | 27560 | 19600 | 18710 |
| Mw | g/mol | 68350 | 62670 | 49680 |
| Mz | g/mol | 140400 | 127700 | 107800 |
| Mw/Mn | unitless | 2.48 | 3.20 | 2.66 |
| Mz/Mw | unitless | 2.05 | 2.04 | 2.05 |
| Absolute GPC | | | | |
| Mn absolute | g/mol | 47763 | 18204 | 18452 |
| Mw absolute | g/mol | 115430 | 62770 | 52290 |
| Mz(BB) | g/mol | 130400 | 131000 | 108100 |
| Mz(BB)/Mw(avg) | unitless | 1.89 | 2.22 | 2.21 |
| Shear Viscosity at ~3000 s⁻¹ | Pa-s | | 132.4 | 119.2 |
| methyls | per 1000 C's | 2.04 | 0.87 | 1.02 |
| trans | per 1000 C's | 0.067 | 0.033 | 0.074 |
| vinyls | per 1000 C's | 0.023 | 0.002 | 0.000 |

TABLE IIA

| Measurement | Units | Comparative Polymer Composition 1 | Comparative Polymer Composition 2 | Comparative Polymer Composition 3 |
|---|---|---|---|---|
| Density | g/cm³ | 0.9 | 0.9 | 0.941 |
| $I_2$ | g/10 min | — | — | 4 |
| $I_{10}/I_2$ | — | — | — | 6.8 |
| Melt Flow Rate ($I_2$ @ 230° C.) | g/10 min | 9.5 | 38 | — |
| Conventional GPC | | | | |
| Mn | g/mol | 55,000 | 54,000 | 24,000 |
| Mw | g/mol | 245,000 | 160,000 | 83,000 |
| Mz | g/mol | 670,000 | 340,000 | 230,000 |
| Mw/Mn | unitless | 4.5 | 3.0 | 3.5 |
| Mz/Mw | unitless | 2.7 | 2.1 | 2.8 |

TABLE III

| Measurement | Units | Inventive Fiber 1 | Inventive Fiber 2 | Inventive Fiber 3 | Inventive Fiber 4 | Inventive Fiber 5 |
| --- | --- | --- | --- | --- | --- | --- |
| Yarn Denier | g/9000 m | 146 | 147 | 146 | 300 | 299 |
| Denier per Filament (dpf) | g/9000 m | 3.0 | 3.1 | 3.0 | 6 | 2 |
| Tenacity | g/denier | 2.6 | 2.75 | 0.94 | — | — |
| Elongation | % | 61 | 94 | 175 | — | — |
| Young's Modulus | g/denier | — | — | — | — | — |
| Maximum Draw Ratio | $V_2/V_1$ | 3.25 | 4.8 | 2.2 | 3.8 | 2 |

TABLE III A

| Measurement | Units | Comparative Fiber 1 | Comparative Fiber 2 | Comparative Fiber 1A | Comparative Fiber 2A | Comparative Fiber 3A |
| --- | --- | --- | --- | --- | --- | --- |
| Yarn Denier | g/9000 m | 150 | 150 | 309 | 309 | 302 |
| Denier per Filament (dpf) | g/9000 m | 3.1 | 3.1 | 6 | 2.0 | 6 |
| Tenacity | g/denier | 4.3 | 4.2 | — | — | — |
| Elongation | % | 51 | 23 | — | — | — |
| Young's Modulus | g/denier | — | — | — | — | — |
| Maximum Draw Ratio | $V_2/V_1$ | 2.75 | 3.6 | 2.8 | 2 | 2.2 |

TABLE IV

| Measurement | Units | Comparative Fiber 2 | Inventive Fiber 1 | Inventive Fiber 2 | Inventive Fiber 3 |
| --- | --- | --- | --- | --- | --- |
| Boiling Water Shrinkage (Unannealed) | % of initial length | 7.4 | 26 | 15 | 17 |
| Boiling Water Shrinkage (annealed at constant length in hot air at 120° C.) | % of initial length | 1.7 | 3.3 | 1.8 | 2.8 |
| Tenacity (annealed at constant length in hot air at 120° C.) | g/denier | 5.1 | 2.6 | 2.9 | 0.8 |
| Elongation (annealed at constant length in hot air at 120° C.) | % | 20 | 55 | 61 | 113 |

TABLE V

| Smoothness Attribute | | | | | | | | | | | | | | | | |
| --- | --- | --- | --- | --- | --- | --- | --- | --- | --- | --- | --- | --- | --- | --- | --- | --- |
| Sample | Inv. Fab B Standard | | Comp Fab C | Comp Fab B | Inv Fab A | | | Comp Fab A | | | | | | | | |
| Rating Mean | 1.30 1.99 | | 3.71 | 4.26 | 5.30 | | | 8.35 | | | | | | | | |
| Scale | 0 | 1 | 2 | 3 | 4 | 5 | 6 | 7 | 8 | 9 | 10 | 11 | 12 | 13 | 14 | 15 |

TABLE VI

| Waxy Attribute | | | | | | | | | | | | | | | | |
| --- | --- | --- | --- | --- | --- | --- | --- | --- | --- | --- | --- | --- | --- | --- | --- | --- |
| Sample | | | | | | | Inv Fab B Com Fab B | Comp Fab C Inv Fab A | Comp Fab A | | | Standard | | | | |
| Rating Mean | | | | | | | 7.51 7.75 | 8.07 8.21 | 9.23 | | | 12.94 | | | | |
| Scale | 0 | 1 | 2 | 3 | 4 | 5 | 6 | 7 | 8 | 9 | 10 | 11 | 12 | 13 | 14 | 15 |

TABLE VII

Hand Friction Attribute

| Sample | Inv Fab B | Comp Fab C | Comp Fab B Inv Fab A | Comp Fab A | Standard | | | | | | | | | | | |
|---|---|---|---|---|---|---|---|---|---|---|---|---|---|---|---|---|
| Rating Mean | 1.85 | 3.59 | 5.48 5.90 | 7.58 | 8.00 | | | | | | | | | | | |
| Scale | 0 | 1 | 2 | 3 | 4 | 5 | 6 | 7 | 8 | 9 | 10 | 11 | 12 | 13 | 14 | 15 |

TABLE VIII

Stiffness Attribute

| Sample | Inv Fab B | Comp Fabs C B Inv Fab A & Standard | Comp Fab A | | | | | | | | | | | | | |
|---|---|---|---|---|---|---|---|---|---|---|---|---|---|---|---|---|
| Rating Mean | 0.52 | 1.18 and 1.25 1.58 and 1.84 | 3.82 | | | | | | | | | | | | | |
| Scale | 0 | 1 | 2 | 3 | 4 | 5 | 6 | 7 | 8 | 9 | 10 | 11 | 12 | 13 | 14 | 15 |

TABLE IX

Smoothness, Waxy, Hand Friction, and Stiffness Attributes

| Samples Evaluated | Smooth Rating (C.1) | Waxy Rating (C.2) | 15-Waxy (C.3) | Hand Friction Rating (C.4) | Stiffness Rating (C.5) | TOTAL (Avg. of C.1, 3, 4, and 5) |
|---|---|---|---|---|---|---|
| Inv Fab B | 1.30 | 7.51 | 7.49 | 1.85 | 0.52 | 11.2 |
| Comp Fab B | 4.26 | 7.75 | 7.25 | 5.48 | 1.25 | 18.2 |
| Inv Fab A | 5.30 | 8.21 | 6.79 | 5.90 | 1.58 | 19.6 |
| Comp Fab A | 8.25 | 9.23 | 5.77 | 7.58 | 3.82 | 25.4 |
| Comp Fab C | 3.71 | 8.07 | 6.93 | 3.59 | 1.18 | 15.4 |
| Cotton (Std)) | 1.99 | 12.94 | 2.06 | 8.00 | 1.84 | 13.9 |

TABLE X

| Sample | Average Abrasion (Percent Loss in Weight) |
|---|---|
| Inventive Fabric A | 0.7 |
| Inventive Fabric B | 0.8 |
| Comparative Fabric A | 0.8 |
| Comparative Fabric B | 0.8 |
| Comparative Fabric C | 0.6 |

Test Methods

Test methods include the following:

Density (g/cm$^3$) was measured according to ASTM-D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch."

Melt index ($I_2$) was measured at 190° C. under a load of 2.16 kg according to ASTM D-1238-03.

Melt flow rate ($I_5$) was measured at 190° C. under a load of 5.0 kg according to ASTM D-1238-03.

Melt flow rate ($I_{10}$) was measured at 190° C. under a load of 10.0 kg according to ASTM D-1238-03.

Melt flow rate ($I_{21}$) was measured at 190° C. under a load of 21.6 kg according to ASTM D-1238-03.

Weight average molecular weight ($M_w$) and number average molecular weight ($M_n$) were determined according to methods known in the art using triple detector GPC, as described herein below.

The molecular weight distributions of the ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 µm columns and one Shodex HT803M 150 mm, 12 µm column. The solvent used was 1,2,4 trichlorobenzene. The samples were prepared at a concentration of 0.1 grams of polymer in 50 milliliters of solvent. The chromatographic solvent and the sample preparation solvent contained 200 µg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.*, 6, 621 (1968)):

$$M\text{polyethylene} = A \times (M\text{polystyrene})^B,$$

where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatography Polym.* Chpt 12, (1992) and Balke, Thitiratsakul, Lew, Cheung, Mourey, *Chromatography Polym.* Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing $2^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

$$a)\ \overline{Mn} = \frac{\sum_i Wf_i}{\sum_i (Wf_i / M_i)} \tag{2}$$

$$b)\ \overline{Mw} = \frac{\sum_i (Wf_i * M_i)}{\sum_i Wf_i}$$

$$c)\ \overline{Mz} = \frac{\sum_i (Wf_i * M_i^2)}{\sum_i (Wf_i * M_i)}$$

Monomodal distribution was characterized according to the weight fraction of the highest temperature peak in temperature rising elution fractionation (typically abbreviated as "TREF") data as described, for example, in Wild et al., *Journal of Polymer Science, Poly. Phys. Ed.*, Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column was equipped with both an infra-red detector and a differential viscometer (DV) detector. An ATREF-DV chromatogram curve was then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference.

Long Chain Branching was determined according to the methods known in the art, such as gel permeation chromatography coupled with low angle laser light scattering detector (GPC-LALLS) and gel permeation chromatography coupled with a differential viscometer detector (GPC-DV).

Short chain branch distribution breadth (SCBDB) was determined based in the data obtained via analytical temperature rising elution fractionation (ATREF) analysis, described hereinbelow in further details. First, a cumulative distribution of the elution curve was calculated beginning at 30° C. and continuing to and including 109° C. From the cumulative distribution, temperatures were selected at 5 weight percent ($T_5$) and 95 weight percent ($T_{95}$). These two temperatures were then used as the bounds for the SCBDB calculation. The SCBDB is then calculated from the following equation:

$$SCBDB = \sqrt{\frac{\sum_i w_i (T_i - T_w)^2}{\sum_i w_i}}$$

for all $T_i$ including and between $T_5$ and $T_{95}$. $T_i$ is the temperature at the ith point on the elution curve, $w_i$ is the weight fraction of material from each temperature on the elution curve, and $T_w$ is the weight-averaged temperature of the elution curve ($\Sigma(w_i T_i)/\Sigma w_i$) between and including $T_5$ and $T_{95}$.

Analytical temperature rising elution fractionation (ATREF) analysis was conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed was dissolved in trichlorobenzene and allowed to crystallize in a column containing an inert support (stainless steel shot) by slowly reducing the temperature to 20° C. at a cooling rate of 0.1° C./min. The column was equipped with an infrared detector. An ATREF chromatogram curve was then generated by eluting the crystallized polymer sample from the column by slowly increasing the temperature of the eluting solvent (trichlorobenzene) from 20 to 120° C. at a rate of 1.5° C./min.

Comonomer content was measured using $C_{13}$ NMR, as discussed in Randall, *Rev. Macromol. Chem. Chys.*, C29 (2&3), pp. 285-297, and in U.S. Pat. No. 5,292,845, the disclosures of which are incorporated herein by reference to the extent related to such measurement. The samples were prepared by adding approximately 3 g of a 50/50 mixture of tetrachloroethane-d2/orthodichlorobenzene that was 0.025M in chromium acetylacetonate (relaxation agent) to 0.4 g sample in a 10 mm NMR tube. The samples were dissolved and homogenized by heating the tube and its contents to 150° C. The data was collected using a JEOL Eclipse 400 MHz NMR spectrometer, corresponding to a 13 C resonance frequency of 100.6 MHz. Acquisition parameters were selected to ensure quantitative 13 C data acquisition in the presence of the relaxation agent. The data was acquired using gated 1H decoupling, 4000 transients per data file, a 4.7 sec relaxation delay and 1.3 second acquisition time, a spectral width of 24,200 Hz and a file size of 64K data points, with the probe head heated to 130° C. The spectra were referenced to the methylene peak at 30 ppm. The results were calculated according to ASTM method D5017-91.

Melt temperature and crystallization temperature were measured via Differential Scanning Calorimetry (DSC). All of the results reported here were generated via a TA Instruments Model Q1000 DSC equipped with an RCS (refrigerated cooling system) cooling accessory and an auto sampler. A nitrogen purge gas flow of 50 ml/min was used throughout. The sample was pressed into a thin film using a press at 175° C. and 1500 psi (10.3 MPa) maximum pressure for about 15 seconds, then air-cooled to room temperature at atmospheric pressure. About 3 to 10 mg of material was then cut into a 6 mm diameter disk using a paper hole punch, weighed to the nearest 0.001 mg, placed in a light aluminum pan (ca 50 mg) and then crimped shut. The thermal behavior of the sample was investigated with the following temperature profile: The sample was rapidly heated to 180° C. and held isothermal for 3 minutes in order to remove any previous thermal history. The sample was then cooled to −40° C. at 10° C./min cooling rate and was held at −40° C. for 3 minutes. The sample was then heated to 150° C. at 10° C./min heating rate. The cooling and second heating curves were recorded.

Vinyl unsaturations were measured according to ASTM D-6248-98.

Trans unsaturations were measured according to ASTM D-6248-98.

Methyl groups were determined according to ASTM D-2238-92.

Resin stiffness was characterized by measuring the Flexural Modulus at 5 percent strain and Secant Modulii at 1 percent and 2 percent strain, and a test speed of 0.5 inch/min (13 mm/min) according to ASTM D-790-99 Method B.

Tensile testing is determined via ASTM D-638 at 2 inches per minute strain rate.

Tensile impact was determined according to ASTM D-1822-06.

The capillary viscosity measured at 190° C. on a Goettfert Rheograph 2003 fitted with a flat entrance (180°) die of length 20 mm and diameter of 1 mm at apparent shear rates ranging from 100 to 6300 $s^{-1}$. Rabinowitsch correction was applied to account for the shear thinning effect. The corrected shear rate and shear viscosity were reported herein.

Handfeel test was conducted according to the following process to determine the following four attributes on a scale from 0 to 15: (1) Smoothness; (2) Waxy; (3) Stiffness; and (4) Hand Friction.

The following four attributes (1) Smoothness; (2) Waxy; and (3) Hand Friction were analyzed using fabric covered napkins. Four napkins were laid on top of one another and the woven fabric sheet was placed on top of the napkins and taped into place to prevent curling. The napkins were Hoffmaster Linen-Like Dinner napkins, 12"×17", white. The 4.25"×8.5" area used for the evaluation was not embossed, textured, or quilted.

The attribute Stiffness was analyzed using a single sheet of fabric.

The samples were evaluated by a panel comprising of 20 trained individuals. Each of the 20 panelists evaluated (touched) the outside of the samples and rated the amount of Smoothness, Waxy, Stiffness, and Hand Friction characteristics of each sample on a scale from 0 to 15 vis-à-vis a control group, as described herein below. These ratings were averaged and reported.

Each attribute was analyzed using an F-statistic in Analysis of Variance (ANOVA) to determine if there were any significant differences among the samples in the multiple comparisons. The F-ratio in the ANOVA indicated samples to be significantly different, so a Fisher's Least Significant Difference (LSD) was calculated to determine One-at-a-Time multiple comparisons. The Fisher's LSD test is used for pairwise comparisons when a significant F-value has been obtained.

A human sensory panel of 20 was used to evaluate article attributes believed to be associated with the perception of softness. The attributes are defined as follows. Twenty trained panelists evaluated the samples, with a random order of presentation, and random three-digit labeling for the samples. The samples were evaluated for smoothness, waxy, stiffness, and hand friction. Additional information may be found in Sensory Evaluation Techniques, $3^{rd}$ Edition, CRC Press by Meilgaard, Civille, and Carr.

Figure 5:
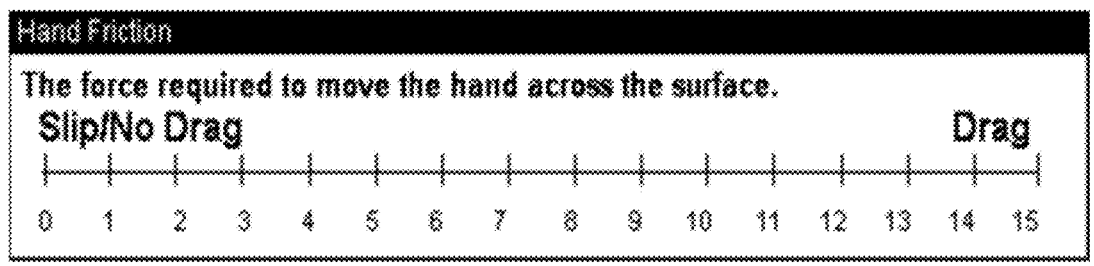
FIG. 5 is a picture depicting a hand friction scale.

Hand friction is evaluated by moving one's hand across the surface of the composite structure. The sample is placed flat on a table, evaluation side up. Using the weight of the hand and forearm, the hand is moved horizontally across the surface in all four directions parallel to the edges. Hand friction is measured on a scale from 0 to 15, where 0 is the no drag (most slip), and 15 is the most drag (least slip), as shown in FIG. 5.

The samples were compared against the following hand-friction control group.

| Rating Scale Value | Fabric Type |
| --- | --- |
| 1.4 | Filament nylon 6.6 semidull taffeta |
| 3.5 | Cotton Egyptian shirting |
| 7.2 | Cotton print cloth |
| 10.0 | Cotton flannel |
| 14.2 | Cotton terry cloth |

Figure 6:
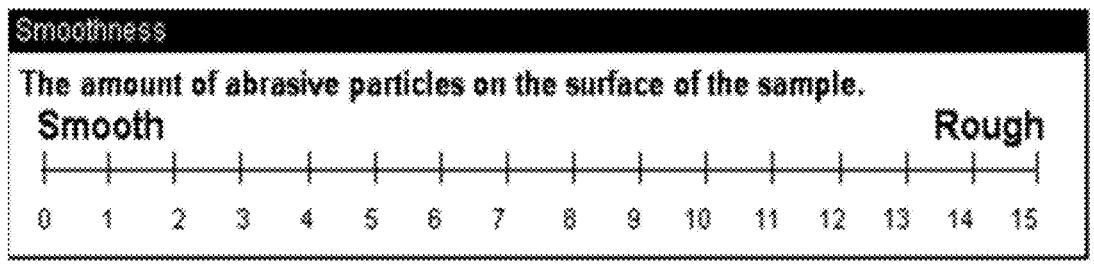
FIG. 6 is a picture depicting a smoothness scale.

Smoothness evaluated the amount of abrasive particles on the surface. The sample is placed flat, and one's dominant hand is placed on top of the sample; using just the weight of the fingers, move the fingers across the surface of the sample. Smoothness is measured on a scale from 0 to 15, were 0 is the most smooth (least rough), and 15 is the least smooth (most rough), as shown in FIG. 6.

The samples were compared against the following smoothness control group.

| Rating Scale Value | Fabric Type |
|---|---|
| 2.1 | Bl. mercerized cotton poplin |
| 4.9 | Army carded cotton sateen bleached |
| 9.5 | Cotton momie fabric |
| 13.6 | #8 Cotton duck greige |

Figure 7:
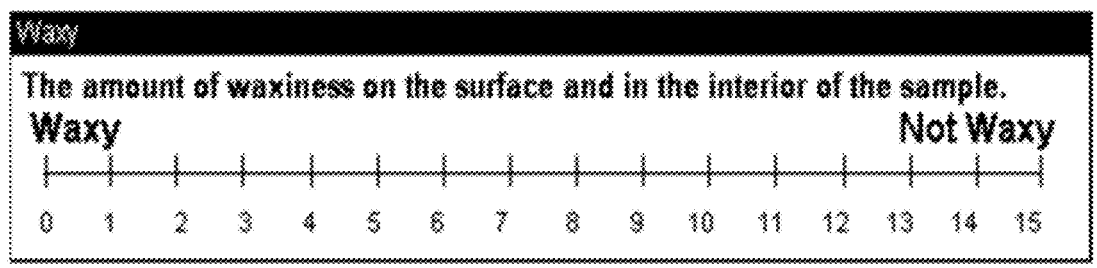
FIG. 7 is a picture depicting a waxy scale.

Waxy attribute evaluates the amount of waxy feel on the surface and the interior of the sample. The sample is placed flat, and one's dominant hand is placed on top of the sample; using just the weight of the fingers, move fingers across the surface of the sample. Waxy is also measured on a scale from 0 to 15, where 0 is the most waxy, and 15 is not waxy, as shown in FIG. 7.

The samples were compared against the following waxy control group.

| Rating Scale Value | Fabric Type |
|---|---|
| 2.0 | Polyethylene (ethylene-octene) (Affinity) non-woven |
| 9.3 | Filament nylon 6 tricot-bright |
| 13.0 | 100% pre-shrunk cotton |

Figure 8:
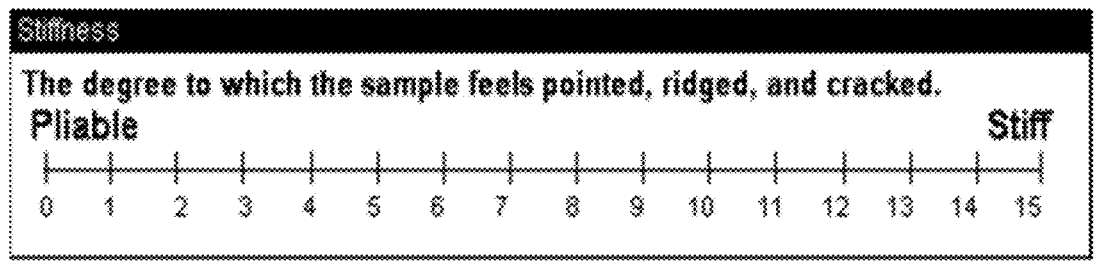
FIG. 8 is a picture depicting a stiffness scale.

Stiffness evaluates the degree to which the sample feels pointed, ridged, or cracked. The sample is placed flat, and one's dominant hand is placed on top of the sample; position so the fingers are pointing toward the top of the sample. The fingers are then closed, gathering the composite sample with fingers toward palm. The non-dominant hand is then used to press the sample into the cupped dominant hand. The dominant hand is then closed slightly and the sample manipulated by rotating the sample in the palm. Stiffness is also measured on a scale from 0 to 15, where 0 is the least stiff (most pliable), and 15 is the stiffest (least pliable), as shown in FIG. 8.

The samples were compared against the following stiffness control group.

| Rating Scale Value | Fabric Type |
|---|---|
| 1.3 | Polyester/cotton 50/50 single knit tubular |
| 4.7 | Mercerized cotton print cloth |
| 8.5 | Mercerized combed cotton poplin |
| 14.0 | Cotton organdy |

The present invention may be embodied in other forms without departing from the spirit and the essential attributes thereof, and, accordingly, reference should be made to the appended claims, rather than to the foregoing specification, as indicating the scope of the invention.

We claim:

1. A fiber comprising:
a polyethylene composition comprising less than or equal to 100 percent by weight of the units derived from ethylene and less than 20 percent by weight of units derived from one or more α-olefin comonomers; wherein said polyethylene composition has a density in the range of 0.930 to 0.960 g/cm$^3$, a molecular weight distribution (Mw/Mn) in the range of 1.70 to 3.5, a melt index (I$_2$) in the range of 1 to 300 g/10 minutes, a molecular weight distribution (Mz/Mw) in the range of less than 2.5, a shear viscosity in the range of 20 to 250 Pascal-s at 3000 s$^{-1}$ shear rate measured at 190° C., vinyl unsaturation of less than 0.1 vinyls per one thousand carbon atoms present in the backbone of said composition; and wherein the fiber is a monocomponent meltspun fiber, and wherein said fiber has an elongation measured in percent of less than 1000.

2. The fiber according to claim 1, wherein said fiber has a denier per filament in the range of less than 50 g/9000 m.

3. The fiber according to claim 1, wherein said fiber has a boiling water shrink measured in percent after being annealed at 120° C. in the range of less than 30.

4. The fiber according to claim 1, wherein said fiber is a staple fiber or a continuous fiber.

5. A process for making a fiber comprising the steps of:
selecting a polyethylene composition comprising less than or equal to 100 percent by weight of the units derived from ethylene and less than 20 percent by weight of units derived from one or more α-olefin comonomers, wherein said polyethylene composition has a density in the range of 0.930 to 0.960 g/cm$^3$, a molecular weight distribution (Mw/Mn) in the range of 1.70 to 3.5, a melt index (I$_2$) in the range of 1 to 300 g/10 minutes, a molecular weight distribution (Mz/Mw) in the range of less than 2.5, a shear viscosity in the range of 20 to 250 Pascal-s at 3000 s$^{-1}$ shear rate measured at 190° C., vinyl unsaturation of less than 0.1 vinyls per one thousand carbon atoms present in the backbone of said composition; and
spinning said polyethylene composition into a fiber, thereby forming a monocomponent meltspun fiber, and wherein said fiber has an elongation measured in percent of less than 1000.

6. The process for making a fiber according to claim 5, wherein said process further comprises the step of orienting said fiber.

7. The process for making a fiber according to claim 5, wherein said fiber is oriented via cold drawing.

8. The process for making a fiber according to claim 5, wherein process further comprises the step of annealing said fiber.

9. The process for making a fiber according to claim 8, wherein said annealing step is carried out at 100° C. or above.

10. The process for making a fiber according to claim 8, wherein said fiber is annealed at a fixed length.

11. The process for making a fiber according to claim 8, wherein said fiber is drawn at least 1.5X, wherein X is the ratio of the draw roll speed to the feed roll speed.

12. A fabric comprising:
one or more monocomponent meltspun fibers having an elongation measured in percent of less than 1000, wherein the one or more monocomponent meltspun fibers are from a polyethylene composition comprising less than or equal to 100 percent by weight of the units derived from ethylene and less than 20 percent by weight of units derived from one or more α-olefin comonomers, wherein said polyethylene composition has a density in the range of 0.930 to 0.960 g/cm$^3$, a molecular weight distribution (Mw/Mn) in the range of 1.70 to 3.5, a melt index (I$_2$) in the range of 1 to 300 g/10 minutes, a molecular weight distribution (Mz/Mw) in the range of less than 2.5, a shear viscosity in the range of 20 to 250 Pascal-s at 3000 s$^{-1}$ shear rate measured at 190° C., vinyl unsaturation of less than 0.1 vinyls per one thousand carbon atoms present in the backbone of said composition.

13. The fabric according to claim 12, wherein said fabric is selected from the group consisting of woven fabric, non-woven fabric, and combinations thereof.

14. The fabric according to claim 12, wherein said fabric is a woven fabric, and said woven fabric has an abrasion resistance in the range of less than 5 percent by weight of abraded fiber per weight of the fabric prior to abrasion testing.

15. The fabric according to claim 12, wherein said fabric is an article selected from the group consisting of upholstery, apparel, wall covering, carpet, diaper topsheet, diaper backsheet, medical fabric, surgical wrap, hospital gown, wipe, textile, and geotextile.

16. The fabric according to claim 12, wherein said fabric comprises one or more fibers having a denier per filament in the range of less than 5 g/9000 m, and the fabric has one or more of the following characteristics:
   a smoothness value in the range of less than 2;
   a wax value in the range of greater than 7;
   a hand friction value in the range of less than 3.5; and/or
   a stiffness value in the range of less than 1.1.

\* \* \* \* \*